United States Patent [19]
Miyoshi et al.

[11] Patent Number: 5,748,517
[45] Date of Patent: May 5, 1998

[54] MULTIPLIER CIRCUIT

[75] Inventors: Nobuhiro Miyoshi; Kazuya Yamanaka, both of Tokyo, Japan

[73] Assignees: Mitsubishi Denki Kabushiki Kaisha; Mitsubishi Electric Engineering Co., Ltd., both of Tokyo, Japan

[21] Appl. No.: 562,100

[22] Filed: Nov. 22, 1995

[30] Foreign Application Priority Data

Feb. 24, 1995 [JP] Japan ................................ 7-036911

[51] Int. Cl.$^6$ ................................................ G06F 7/52
[52] U.S. Cl. ........................... 364/760.01; 364/760.03
[58] Field of Search ............................. 364/736, 754, 364/757, 758, 759, 760, 760.01, 760.02, 760.03, 760.04, 760.05

[56] References Cited

U.S. PATENT DOCUMENTS

| | | | |
|---|---|---|---|
| 5,231,415 | 7/1993 | Hagihara | 364/760 |
| 5,235,536 | 8/1993 | Matsubishi et al. | 364/736 |
| 5,235,538 | 8/1993 | Sumi et al. | 364/760 |
| 5,251,167 | 10/1993 | Simmonds et al. | 364/760 |

FOREIGN PATENT DOCUMENTS

| | | |
|---|---|---|
| 62-154029 | 7/1987 | Japan. |
| 6-214761 | 8/1994 | Japan. |

*Primary Examiner*—Chuong Dinh Ngo
*Attorney, Agent, or Firm*—Oblon, Spivak, McClelland, Maier & Neustadt, P.C.

[57] ABSTRACT

It is an object to obtain a multiplier circuit with reduced circuit scale or with reduced power consumption. Booth decoders (BD1–BD3) receive overlapping three bits of a 6-bit multiplier (Y) (Y0–Y5), respectively, and output partial product information groups (S1–S5) to partial product generating circuits (PP1–PP3) on the basis of the three bits of the multiplier (Y), respectively. Each partial product information is provided in a one-to-one correspondence for each kind of partial product. The partial product generating circuits (PP1–PP3) respectively receive the partial product information groups (S1–S5) from the respective Booth decoders (BD1–BD3) and a 8-bit multiplicand (X) (X0–X7), and output partial products (SM1–SM3) to a partial product adder circuit (ADD1). The partial product adder circuit (ADD1) adds the partial products (SM1–SM3) and outputs a multiplication result (XY) of the multiplier (Y) and the multiplicand (X).

5 Claims, 22 Drawing Sheets

FIG. 3

| MULTIPLIER | | | | | | | PARTIAL PRODUCT |
|---|---|---|---|---|---|---|---|
| Y2i-1 | Y2i | Y2i+1 | S1 | S2 | S3 | S4 | S5 |  |
| 0 | 0 | 0 | 1 | 0 | 0 | 0 | 0 | 0 |
| 0 | 0 | 1 | 0 | 0 | 0 | 0 | 0 | −2X |
| 0 | 1 | 0 | 0 | 0 | 1 | 1 | 0 | X |
| 0 | 1 | 1 | 0 | 1 | 0 | 0 | 0 | −X |
| 1 | 0 | 0 | 0 | 0 | 1 | 0 | 0 | X |
| 1 | 0 | 1 | 0 | 1 | 0 | 0 | 0 | −X |
| 1 | 1 | 0 | 0 | 0 | 0 | 0 | 1 | 2X |
| 1 | 1 | 1 | 1 | 0 | 0 | 0 | 0 | 0 |

*FIG. 4*

| S 1 | S 2 | S 3 | S 4 | S 5 | OUTPUT |
|---|---|---|---|---|---|
| 1 | 0 | 0 | 0 | 0 | 0 |
| 0 | 1 | 0 | 0 | 0 | $-X$ |
| 0 | 0 | 1 | 0 | 0 | $X$ |
| 0 | 0 | 0 | 1 | 0 | $-2X$ |
| 0 | 0 | 0 | 0 | 1 | $2X$ |

FIG. 20
PRIOR ART

| MULTIPLIER | | | SHIFT SIGNAL | INVERSION SIGNAL | ENABLE SIGNAL | PARTIAL PRODUCT |
| --- | --- | --- | --- | --- | --- | --- |
| Y2i-1 | Y2i | Y2i+1 | C1 | C2 | C3 | |
| 0 | 0 | 0 | 1 | 0 | 0 | 0X |
| 0 | 0 | 1 | 1 | 1 | 1 | -2X |
| 0 | 1 | 0 | 0 | 0 | 1 | X |
| 0 | 1 | 1 | 0 | 1 | 1 | -X |
| 1 | 0 | 0 | 0 | 0 | 1 | X |
| 1 | 0 | 1 | 1 | 1 | 1 | -X |
| 1 | 1 | 0 | 1 | 0 | 1 | 2X |
| 1 | 1 | 1 | 1 | 1 | 0 | 0X |

FIG. 21
PRIOR ART

| SHIFT SIGNAL C1 | INVERSION SIGNAL C2 | ENABLE SIGNAL C3 | OUTPUT |
|---|---|---|---|
| 1 | 0 | 0 | 0 X |
| 1 | 1 | 1 | $-$ X |
| 0 | 0 | 1 | 2 X |
| 0 | 1 | 1 | $-$ 2 X |
| 1 | 0 | 1 | X |
| 1 | 1 | 0 | 0 X |

MULTIPLIER CIRCUIT

BACKGROUND OF THE INVENTION

1. Field of the Invention

The present invention relates to a multiplier circuit which produces partial products of a multiplier Y and a multiplicand X by the secondary Booth's algorithm and adds them to obtain a product and, particularly to reductions of area and power consumption thereof.

2. Description of the Background Art

Multiplier circuits for the product-sum operation are essential in digital signal processing. The number of bits of data are on the increase in the trend to digitization and speeding up in the recent communication, video signal processing, aural signal processing, etc. With the increase in the number of bits of data, the circuit scale of multiplier circuits for multiplying the data increases exponentially.

In the multiplier circuits for digital signals, which are generally manufactured using semiconductor integrated circuit technology, an area for a single chip of a digital signal processing LSI increases with the increase in the circuit scale, producing such problems as increased manufacturing cost, low yield in production, and the like.

A reduction of the number of partial products has conventionally been considered for the purpose of reducing the area of multiplier circuits, and what is most used in the production of the partial products is the Booth's algorithm.

FIG. 18 is a block diagram showing structure of a conventional multiplier circuit for realizing the Booth's algorithm.

Booth decoders BD11–BD13 receive overlapping three bits in a 6-bit multiplier Y (Y0–Y5), respectively. That is to say, the Booth decoder BD11 receives "0", Y0, Y1, the Booth decoder BD12 receives Y1, Y2, Y3, and the Booth decoder BD13 receives Y3, Y4, Y5.

Then, the Booth decoders BD11–BD13 output a shift signal C1, an inversion signal C2 and an enable signal C3 to partial product generating circuits PP11–PP13 on the basis of the received three bits of the multiplier Y, respectively.

Receiving the output signals C1–C3 from the respective Booth decoders BD11–BD13 and a 8-bit multiplicand X (X0–X7), respectively, the partial product generating circuits PP11–PP13 output partial products SM11–SM13 to a partial product adder circuit ADD1.

The partial product adder circuit ADD1 adds SM11–SM13 to output a multiplication result XY of the multiplier Y and the multiplicand X.

FIG. 19 is a circuit diagram showing the internal structure of the Booth decoder BD. In the figure, the least significant multiplier Y2$i$–1 corresponds to 0, Y1, Y3 of the Booth decoders BD11–BD13, an intermediate multiplier Y2$i$ corresponds to Y0, Y2, Y4 of the Booth decoders BD11–BD13, and the most significant multiplier Y2$i$+1 corresponds to Y1, Y3, Y5 of the Booth decoders BD11–BD13.

An EXOR gate 20 receives the least significant multiplier Y2$i$–1 and the intermediate multiplier Y2$i$ to output exclusive OR of the two to an inverter 21 and an OR gate 24. An EXOR gate 22 receives the intermediate multiplier Y2$i$ and the most significant multiplier Y2$i$+1 to output exclusive OR of the two to the OR gate 24. An EXOR gate 23 receives the least significant multiplier Y2$i$–1 and the most significant multiplier Y2$i$+1 to output exclusive OR of the two to the OR gate 24. Then, the output of the inverter 21 is outputted as the shift signal C1, the most significant multiplier Y2$i$+1 is outputted as the inversion signal C2 as it is, and the output of the OR gate 24 is outputted as the enable signal C3.

FIG. 20 is a diagram showing the relation among successive three-bits of the multiplier Y (Y2$i$–1, Y2$i$, Y2$i$+1), the outputs of the Booth decoder BD (C1–C3) and the partial products (0X, X, 2X, –X, –2X), and FIG. 21 is a diagram showing the relation between the outputs of the Booth decoder BD (C1–C3) and the partial products (0X, X, 2X, –X, –2X).

As shown in FIG. 20, the Booth decoder BD outputs the shift signal C1, the inversion signal C2 and the enable signal C3 on the basis of the successive three bits (Y2$i$–1, Y2$i$, Y2$i$+1) of the multiplier Y.

The enable signal C3 is a signal indicating whether a partial product is 0X/not with "0"/"1", the shift signal C1 is a signal indicating whether a partial product is 2X, –2X/not with "1"/"0" when the enable signal C3 is "1", and the inversion signal C2 is a signal indicating whether a partial product is –X, –2X/not with "1"/"0" when the enable signal C3 is "1".

Accordingly, the three signals C1–C3 outputted from the Booth decoder BD determine the partial product (0X, X, 2X, –X, –2X) as shown in FIG. 21.

FIG. 22 is a circuit diagram showing the inside structure of a 1-bit partial product generating circuit in the partial product generating circuit PP (the partial product generating circuits PP11–PP13). In the figure, XA, XB are a low order bit and a high order bit in successive two bits in the multiplicand X. A transfer gate 30 receives the low order bit XA at its input portion, receives the shift signal C1 at the gate of the NMOS transistor portion, and receives an inversion shift signal $\overline{C1}$ which is obtained from the shift signal C1 passing through an inverter 31 at the gate of the PMOS transistor portion, and it has its output portion connected to one input of an EXOR gate 33. A transfer gate 32 receives the high order bit XB at its input portion, receives the shift signal C1 at the gate of the PMOS transistor portion, and receives the inversion shift signal $\overline{C1}$ which is obtained from the shift signal C1 passing through the inverter 31 at the gate of the NMOS transistor portion, and has its output portion connected to the other input of the EXOR gate 33.

The output of the EXOR gate 33 becomes one input to an AND gate 34, whose other input is the enable signal C3. Then, the output of the AND gate 34 becomes a 1-bit partial product Q.

In such structure, the partial product generating circuit PP outputs "0" as the 1-bit partial product Q of "0" when the enable signal C3 is "0", selects the low order bit XA/high order bit XB on the basis of "1"/"0" of the shift signal C1 when the enable signal C3 is "1", and outputs information obtained by inverting/non-inverting the selected bit on the basis of the "1"/"0" of the inversion signal C2 as the 1-bit partial product Q.

By forming one-bit partial product generating circuits with such a structure adjacent to one another by the number of bits of the multiplicand C, XN, +1, the partial product generating circuit PP is configured.

In the conventional multiplier circuit according to the Booth's algorithm which is configured as described above, if the number of bits of the multiplier Y is YN and the number of bits of the multiplicand is XN, (YN/2)×(XN+1) 1-bit partial product generating circuits for generating 1-bit partial products Q are required, causing a problem of increasing the circuit scale.

Also, the partial product adder circuit ADD 1 had a problem of large power consumption because it constantly operates.

SUMMARY OF THE INVENTION

A first aspect of the present invention is directed to a multiplier circuit for generating a plurality of partial products of a multiplier Y and a multiplicand X by the Booth's algorithm and adding the plurality of partial products to obtain a multiplicand result XY of the multiplier Y and the multiplicand X. According to the present invention, the multiplier circuit comprises: decode means receiving the multiplier Y for decoding the multiplier Y to output a plurality of partial product information groups indicating kinds of the partial products with the multiplicand X, the plurality of partial product information groups respectively having a plurality of partial product information provided in a one-to-one correspondence for each kind of partial product; partial product generating means receiving the multiplicand X and the plurality of partial product information groups for generating the plurality of partial products of the multiplicand X and the multiplier Y on the basis of the plurality of partial product information groups; and partial product adding means receiving the plurality of partial products for adding the plurality of partial products to output the multiplication result XY.

Preferably, in the multiplier circuit according to a second aspect of the invention, in each of the plurality of partial product information groups, a piece of information in the plurality of partial product information is partial product 0X information indicating whether the partial product is 0X of multiplying the multiplicand X by 0 or not, and the partial product adding means includes a plurality of adders each performing an adding processing of its one input and the other input, and further receives the plurality of partial product 0X information in the plurality of partial product information groups, recognizes a partial product of "0" from the plurality of partial products on the basis of the plurality of partial product 0X information and, without effectively operating a 0 input adder receiving the recognized "0" partial product as one input in the plurality of adders, performing an add processing while directly outputting the other input of the 0 input adder as a multiplication result, skipping the 0 input adder.

Preferably, according to a third aspect of the present invention, the multiplier circuit further comprises storage means for storing the plurality of partial product information groups, wherein the partial product generating means receives the partial product information groups from the storage means.

According to a fourth aspect of the present invention, a multiplier circuit for obtaining a multiplication result XY of a multiplier Y and a multiplicand X according to the Booth's algorithm comprises: storage means receiving a plurality of partial product information groups indicating kinds of partial products with the multiplicand X determined on the basis of the multiplier Y and storing the plurality of partial product information groups, the plurality of partial product information groups respectively having a plurality of partial product information provided for each kind of the partial product in a one-to-one correspondence, respectively; partial product generating means receiving the multiplicand X from the outside and the plurality of partial product information groups from the storage means, for generating a plurality of partial products of the multiplicand X and the multiplier Y on the basis of the plurality of partial product information groups; and partial product adding means receiving the plurality of partial products for adding the plurality of partial products to output the multiplication result XY.

In the multiplier circuit according to the first aspect of the present invention, the decode means outputs the plurality of partial product information groups respectively having the plural pieces of partial product information provided in a one-to-one correspondence for each kind of partial product and the partial product generating means generates the plurality of partial products with the multiplicand X on the basis of the plurality of partial product information groups.

Accordingly, the partial product generating means can output the partial products with relatively simple circuit configuration in which selection circuits are provided in a one-to-one correspondence for the plural pieces of partial product information of the plurality of partial product information groups.

As a result, the circuit configuration of the partial product generating means can be simplified and the circuit scale of the entire multiplier circuit can thus be considerably reduced.

Also, the partial product adding means of the multiplier circuit according to the second aspect recognizes partial product of "0" from the plurality of partial products on the basis of the plural pieces of partial product 0X information and, without effectively operating the 0 input adder receiving the recognized "0" partial product as one input in the plurality of adders, performs the adding processing while outputting the other input of the 0 input adder as an add result, skipping the 0 input adder, so that an add result can be obtained without effectively operating 0 input adders which are not required to actually perform the add operation in the plurality of adders.

As a result, the plurality of adders in the partial product adding means can be used efficiently, and the power consumption for the entire circuit can be reduced.

Also, since the multiplier circuit according to the third aspect further comprises the storage means for storing the plurality of partial product information groups and the partial product generating means receives the partial product information groups from the storage means, when sequentially obtaining multiplicand results XY with a fixed multiplier Y and changed multiplicands X, it is not necessary to obtain output of the plurality of partial product information groups by the decode means in and after the second time, which provides reduced power consumption of the circuit.

In the multiplier circuit according to the fourth aspect of the present invention, the storage means stores the plurality of partial product information groups respectively having the plurality of partial product information provided in a one-to-one correspondence for each kind of partial product and the partial product generating means generates a plurality of partial products with the multiplicand X on the basis of the plurality of partial product information groups obtained from the storage means.

Accordingly, the partial product generating means can output the partial products with a relatively simple circuit configuration in which selection circuits are provided in a one-to-one correspondence for the plurality of partial product information of the plurality of partial product information groups.

As a result, the circuit configuration of the partial product generating means can be simplified and then the circuit scale of the entire multiplier circuit can be considerably reduced.

In addition, the structure with the storage means, the partial product generating means and the partial product adding means can obtain the multiplicand result XY without using means for decoding the multiplier Y to obtain the plurality of partial product information groups, so that the circuit scale can be reduced and the power consumption can be reduced.

The present invention has been made to solve problems described earlier, and it is an object to obtain a multiplier circuit with reduced circuit scale or reduced power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram showing the interrelation among the three-bit multiplier, the partial product information and the partial products.

FIG. 4 is a diagram showing the interrelation between the partial product information and the partial products.

FIG. 20 is a diagram showing the interrelation among the 3-bit multiplier, the partial product information and the partial products.

FIG. 21 is a diagram showing the interrelation between the partial product information and the partial products.

DESCRIPTION OF THE PREFERRED EMBODIMENTS

<<First Preferred Embodiment>>

Figure 1:
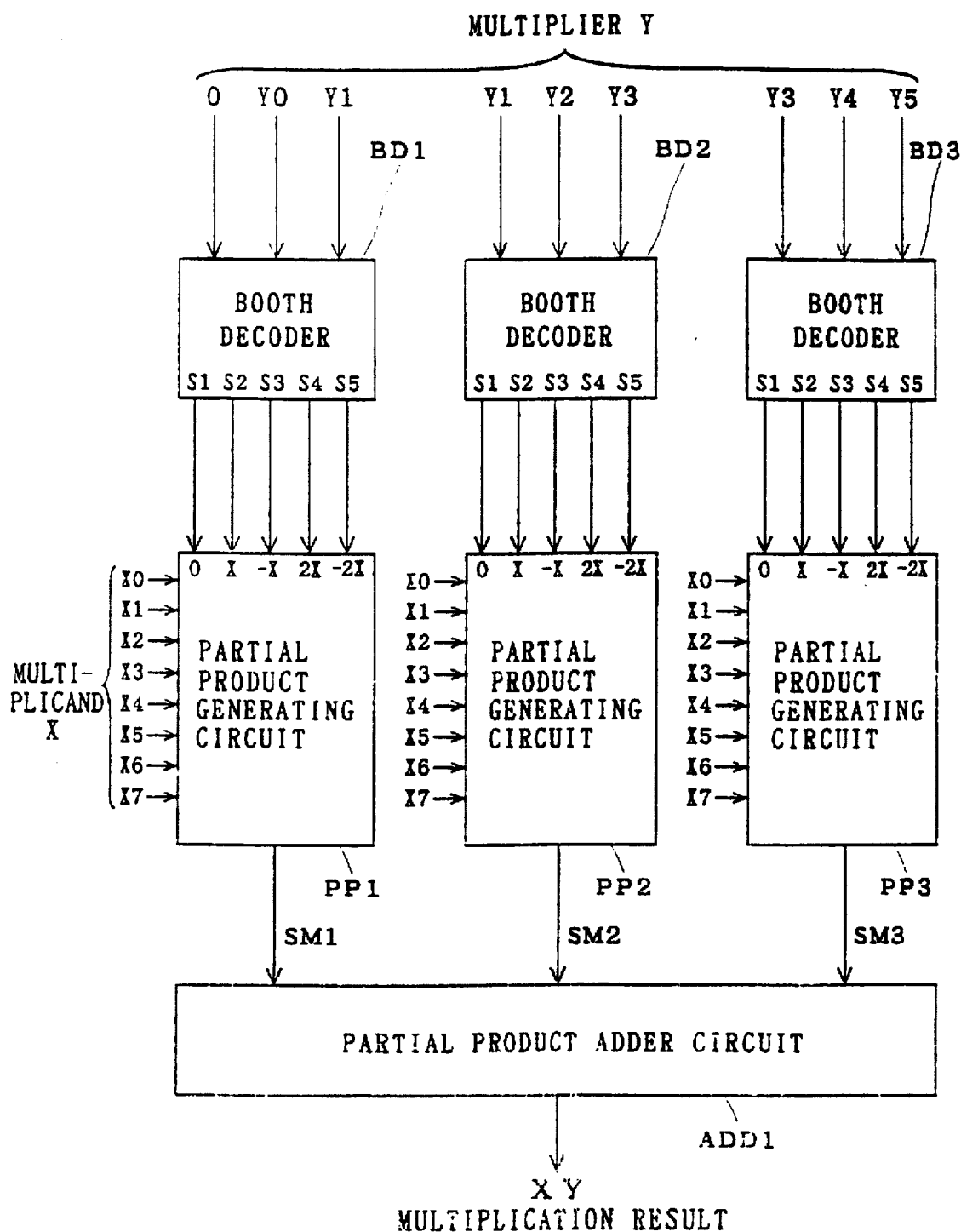
FIG. 1 is a block diagram showing the structure of a multiplier circuit according to a first preferred embodiment of the present invention.

FIG. 1 is a block diagram showing the structure of a multiplier circuit of a first preferred embodiment of the present invention which realizes Booth's algorithm.

Booth decoders BD1–BD3 receive overlapping three bits of a 6-bit multiplier Y (Y0–Y5), respectively. That is to say, the Booth decoder BD1 receives "0", Y0, Y1, the Booth decoder BD2 receives Y1, Y2, Y3, and the Booth decoder BD3 receives Y3, Y4, Y5.

Then, the Booth decoders BD1–BD3 output partial product information groups S1–S5 to partial product generating circuits PP1–PP3 on the basis of the received three bits of the multiplier Y, respectively. Each partial product information is provided for each kind of partial product in a one-to-one correspondence.

The partial product generating circuits PP1–PP3 receive the partial product information groups S1–S5 from the Booth decoders BD1–BD3, respectively, and an 8-bit multiplicand X (X0–X7), and output partial products SM1–SM3 to an partial product adder circuit ADD1.

The partial product adder circuit ADD1 adds SM1–SM3 to output a multiplication result XY of the multiplier Y and the multiplicand X.

Figure 2:
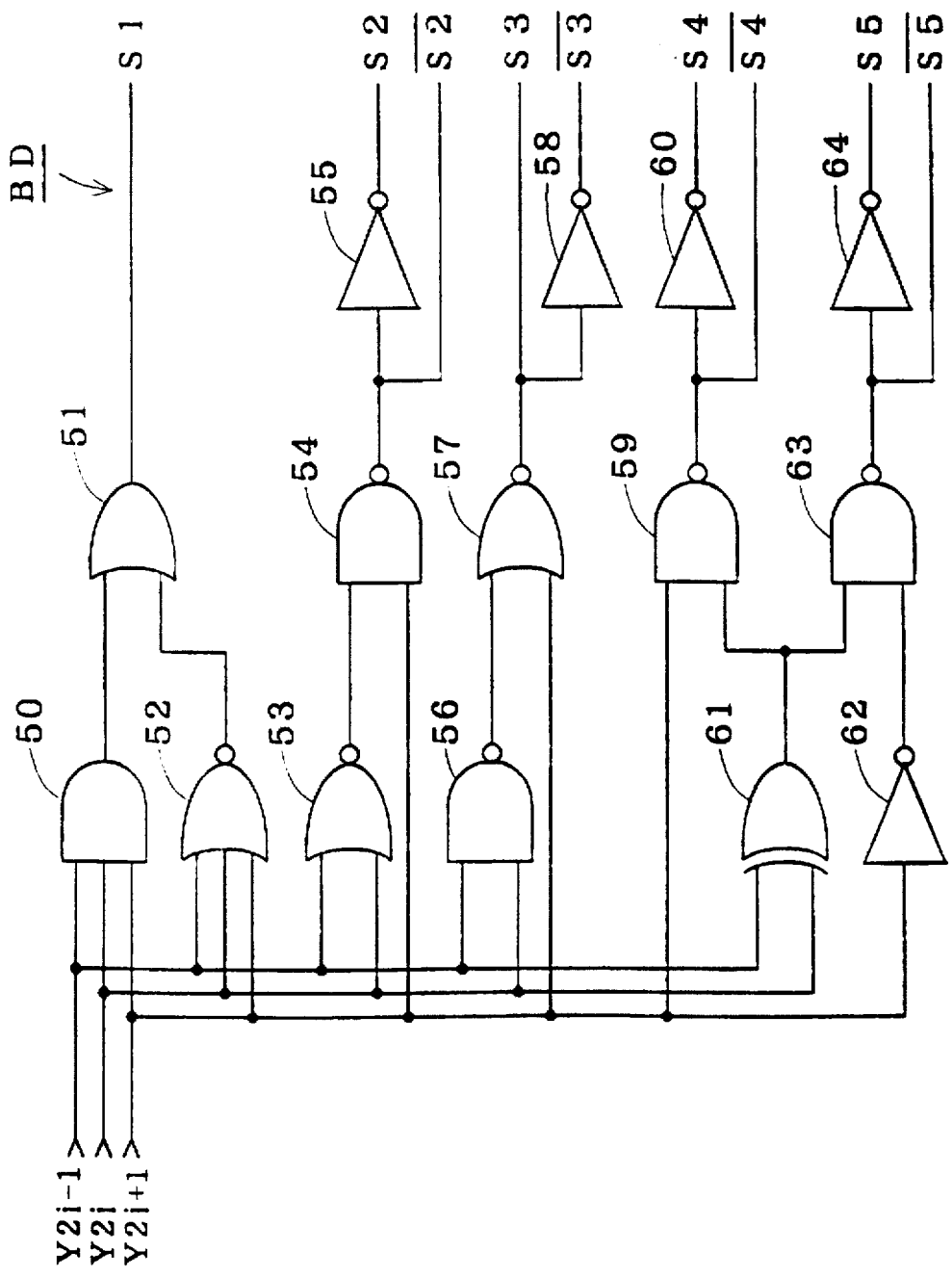
FIG. 2 is a circuit diagram showing the internal configuration of the Booth decoder of FIG. 1.

FIG. 2 is a circuit diagram showing the internal configuration of the Booth decoder BD (BD1–BD3). In the figure, the least significant multiplier Y2$i$–1 corresponds to 0, Y1, Y3 of the Booth decoders BD1–BD3, the intermediate multiplier Y2$i$ corresponds to Y0, Y2, Y4 of the Booth decoders BD1–BD3, and the most significant multiplier Y2$i$+1 corresponds to Y1, Y3, Y5 of the Booth decoders BD1–BD3.

An AND gate 50 receives the least significant multiplier Y2$i$–1, the intermediate multiplier Y2$i$ and the most significant multiplier Y2$i$+1 as inputs and provides a result of the logic operation as an output to an OR gate 51. A NOR gate 52 receives the least significant multiplier Y2$i$–1, the intermediate multiplier Y2$i$ and the most significant multiplier Y2$i$+1 as inputs and outputs a result of the logic operation to the OR gate 51. The output of the OR gate 51 becomes the partial product information S1.

A NOR gate 53 receives the least significant multiplier Y2$i$–1 and the intermediate multiplier Y2$i$ and outputs a result of the logic operation to a NAND gate 54. A NAND gate 56 receives the least significant multiplier Y2$i$–1 and the intermediate multiplier Y2$i$ and outputs a result of the logic operation to a NOR gate 57. The NAND gate 54 further receives the most significant multiplier Y2$i$+1 and outputs a result of the logic operation as an inversion partial product information $\overline{S2}$, and also outputs as the partial product information S2 through an inverter 55. The NOR gate 57 further receives the most significant multiplier Y2$i$+1 and outputs a result of the logic operation as the partial product information S3, and also outputs as the inversion partial product information $\overline{S3}$ through an inverter 58.

An EXOR gate 61 receives the least significant multiplier Y2$i$–1 and the intermediate multiplier Y2$i$ and outputs a result of the logic operation to a NAND gate 59 and a NAND gate 63. The NAND gate 59 further receives the most significant multiplier Y2$i$+1 and outputs a result of the logic operation as the inversion partial product information $\overline{S4}$, and also outputs as the partial product information S4 through an inverter 60. The NAND gate 63 further receives the intermediate multiplier Y2$i$ through an inverter 62 and outputs a result of the logic operation as the inversion partial product information $\overline{S5}$ and also outputs as the partial product information S5 through an inverter 64.

FIG. 3 is a diagram showing the relation among the successive three bits of multiplier Y (Y2$i$–1, Y2$i$, Y2$i$+1), the partial product information (S1–S5) outputted from the Booth decoder BD and the partial products (0X, X, 2X, -X, -2X), and FIG. 4 is a diagram showing the relation between the partial product information (S1-S5) of the Booth decoder BD and the partial products (0X, X, 2X, -X, -2X).

As shown in FIG. 3, the Booth decoder BD outputs the partial product information group S1-S5 on the basis of the successive three bits of the multiplier Y (Y2$i$-1, Y2$i$, Y2$i$+1).

The partial product information S1 is a signal indicating whether the partial product is 0X/not by "1"/"0", the partial product information S2 is a signal indicating whether the partial product is -X/not by "1"/"0", the partial product information S3 is a signal indicating whether the partial product is X/not by "1"/"0", the partial product information S4 is a signal indicating whether the partial product is -2X/not by "1"/"0", and the partial product information S5 is a signal indicating whether the partial product is 2X/not by "1"/"0". This way, each partial product information Si (i=1-5) is provided for every kind of partial product in a one-to-one correspondence.

Accordingly, the 5-bit partial product information group S1-S5 outputted from the Booth decoder BD determines the partial product (0X, X, 2X, -X, -2X) as shown in FIG. 4.

Figure 5:
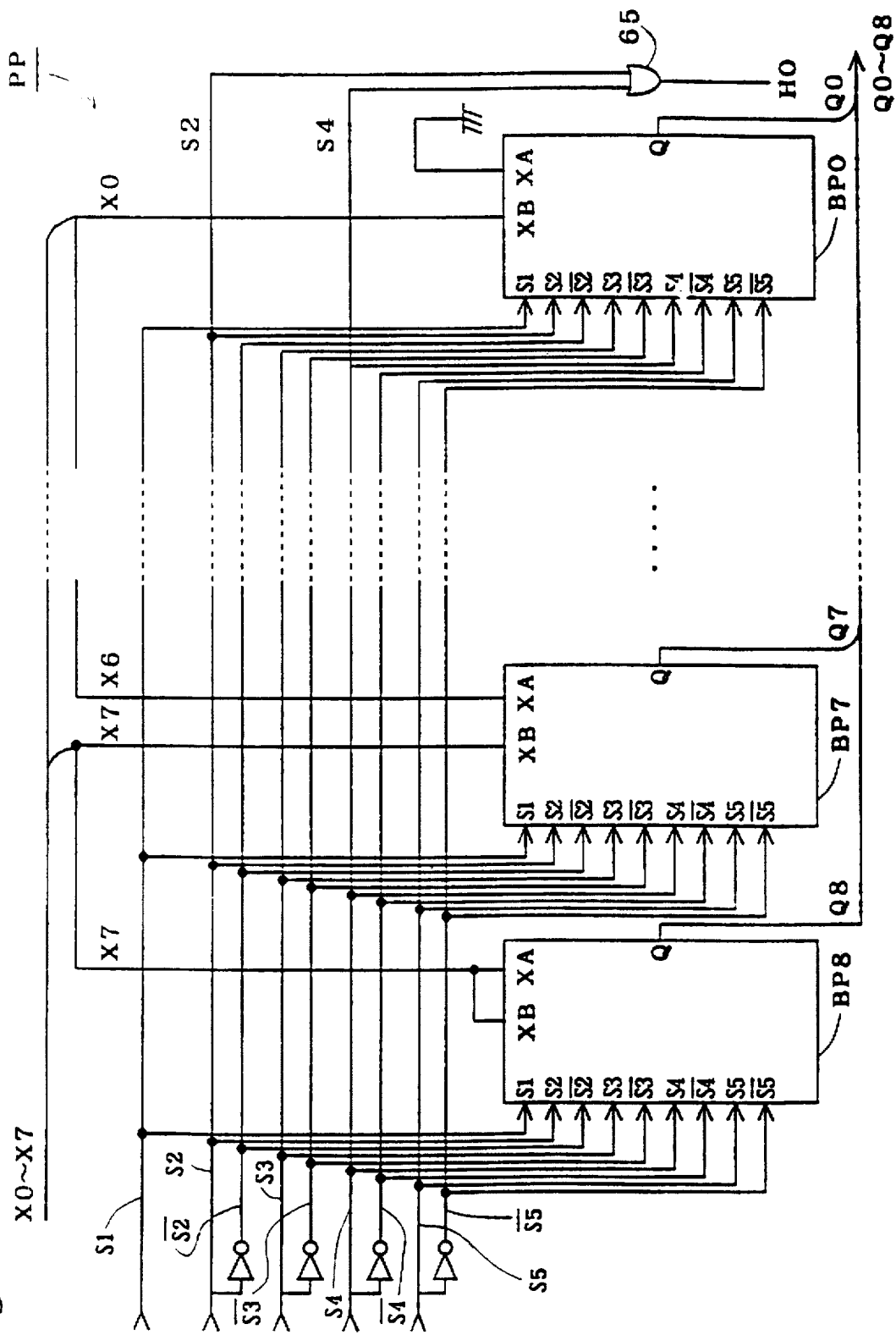
FIG. 5 is a circuit diagram showing the internal configuration of the partial product generating circuit of FIG. 1.

FIG. 5 is a circuit diagram showing the internal configuration of the partial product generating circuit PP (the partial product generating circuits PP1-PP3). The partial product generating circuit PP includes nine 1-bit partial product generating circuits BP0-BP8 (BP1-BP6 are not shown), and an OR gate 65.

The OR gate 65 receives the partial product information S2 and the partial product information S4, a result of which logic operation is outputted as inversion bit information H0. The 1-bit partial product generating circuit BP0 receives the partial product information group S1-S5 (including the inversion partial product information $\overline{S2}$-$\overline{S5}$) and also receives "0" as a low order bit XA and a multiplicand bit X0 as a high order bit XB, and outputs a 1-bit partial product Q0. The 1-bit partial product generating circuit BPk (k=1-7) receives the partial product information group S1-S5 (the inversion partial product information $\overline{S2}$-$\overline{S5}$), and also receives a multiplicand bit X(k-1) as a low order bit XA and a multiplicand bit Xk as a high order bit XB, and outputs a 1-bit partial product Qk. Further, the 1-bit partial product generating circuit BP8 receives the partial product information group S1-S5 (the inversion partial product information $\overline{S2}$-$\overline{S5}$) and also receives a multiplicand bit X7 as a low order bit XA, and outputs a 1-bit partial product Q8.

This way, each partial product generating circuit PP outputs a partial product SM (the inversion bit information H0, the 1-bit partial products Q0-Q8) of the multiplicand X (X0-X7) on the basis of the partial product information group S1-S5.

Figure 6:
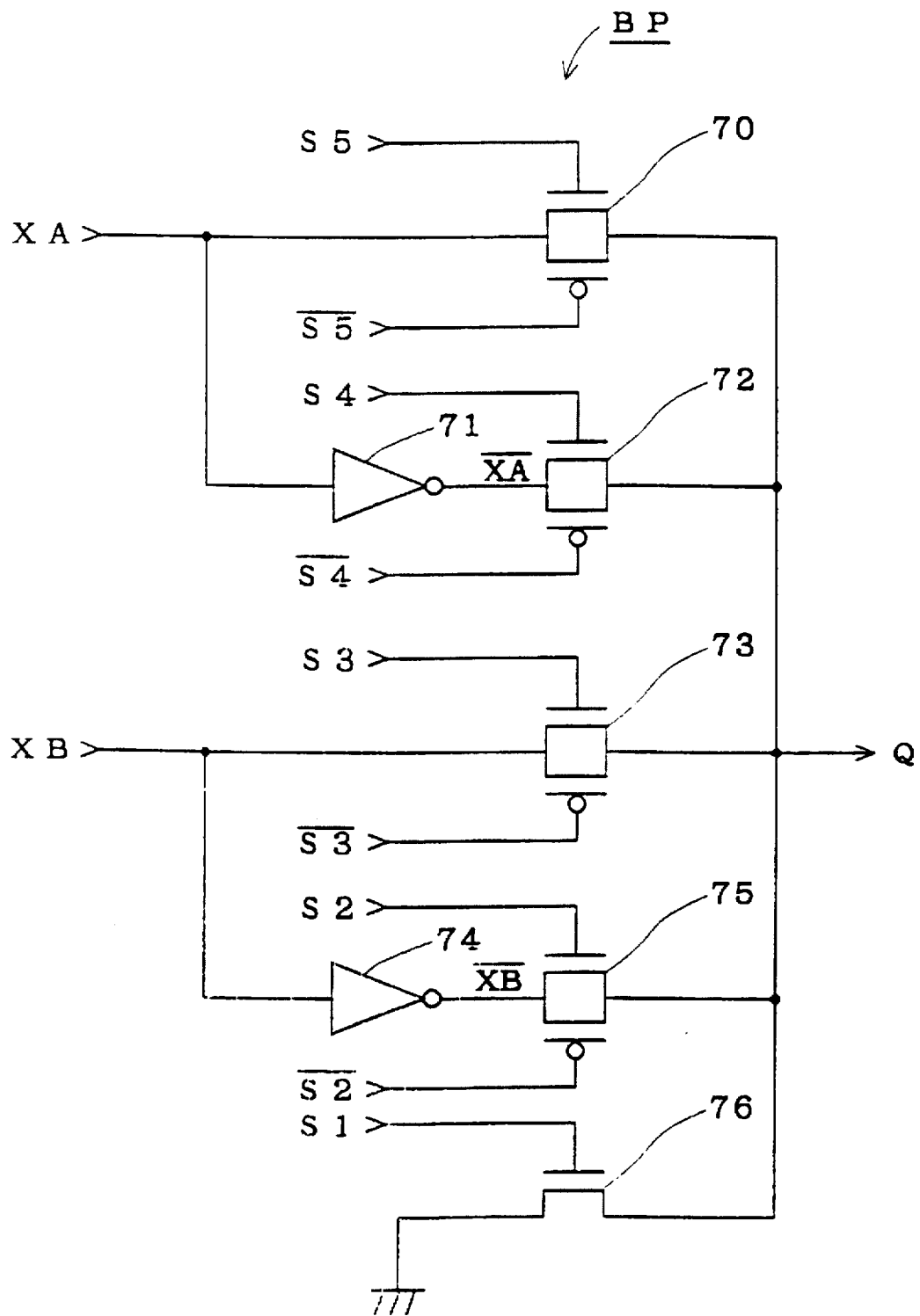
FIG. 6 is a circuit diagram showing the internal configuration of the 1-bit partial product generating circuit of FIG. 5.

FIG. 6 is a circuit diagram showing the internal configuration of the 1-bit partial product generating circuit BP (the 1-bit partial product generating circuits BP1-BP8). In the figure, XA, XB are a low order bit and a high order bit of successive two bits in the multiplicand X. A transfer gate 70 receives the low order bit XA at the input portion, receives the partial product information S5 at the gate of the NMOS transistor portion, and receives the inversion partial product information $\overline{S5}$ at the gate of the PMOS transistor portion, and a signal obtained from its output portion becomes a 1-bit partial product Q.

A transfer gate 72 receives an inversion low order bit $\overline{XA}$ obtained from the low order bit XA passing through an inverter 71 at the input portion, receives the partial product information S4 at the gate of the NMOS transistor portion, and receives the inversion partial product information $\overline{S4}$ at the gate of the PMOS transistor portion, and a signal obtained from its output portion becomes the 1-bit partial product Q.

A transfer gate 73 receives the high order bit XB at its input portion, receives the partial product information S3 at the gate of the NMOS transistor portion, and receives the inversion partial product information $\overline{S3}$ at the gate of the PMOS transistor portion, and the signal obtained from its output portion becomes the 1-bit partial product Q.

A transfer gate 75 receives an inversion high order bit $\overline{XB}$ obtained from the high order bit XB passing through an inverter 74 at the input portion, receives the partial product information S2 at the gate of the NMOS transistor portion, and receives the inversion partial product information $\overline{S2}$ at the gate of the PMOS transistor portion, and the signal obtained from its output portion becomes the 1-bit partial product Q.

An NMOS transistor 76 receives the partial product information S1 at the gate and has its source grounded, and the signal obtained from the drain becomes the 1-bit partial product Q.

In such a structure, the partial product generating circuit PP outputs "0" as the 1-bit partial product Q when the partial product information S1 is "1" (other partial product information S2-S5 are "0"), outputs the inversion high order bit $\overline{XB}$ as the 1-bit partial product Q when the partial product information S2 is "1" (other partial product information S1, S3-S5 are "0"), outputs the high order bit XB as the 1-bit partial product Q when the partial product information S3 is "1" (other partial product information S1, S2, S4, S5 are "0"), outputs the inversion low order bit $\overline{XA}$ as the 1-bit partial product Q when the partial product information S4 is "1" (other partial product information S1-S3, S5 are "0"), and outputs the low order bit XA as the 1-bit partial product Q when the partial product information S5 is "1" (other partial product information S1-S4 are "0").

Figure 7:
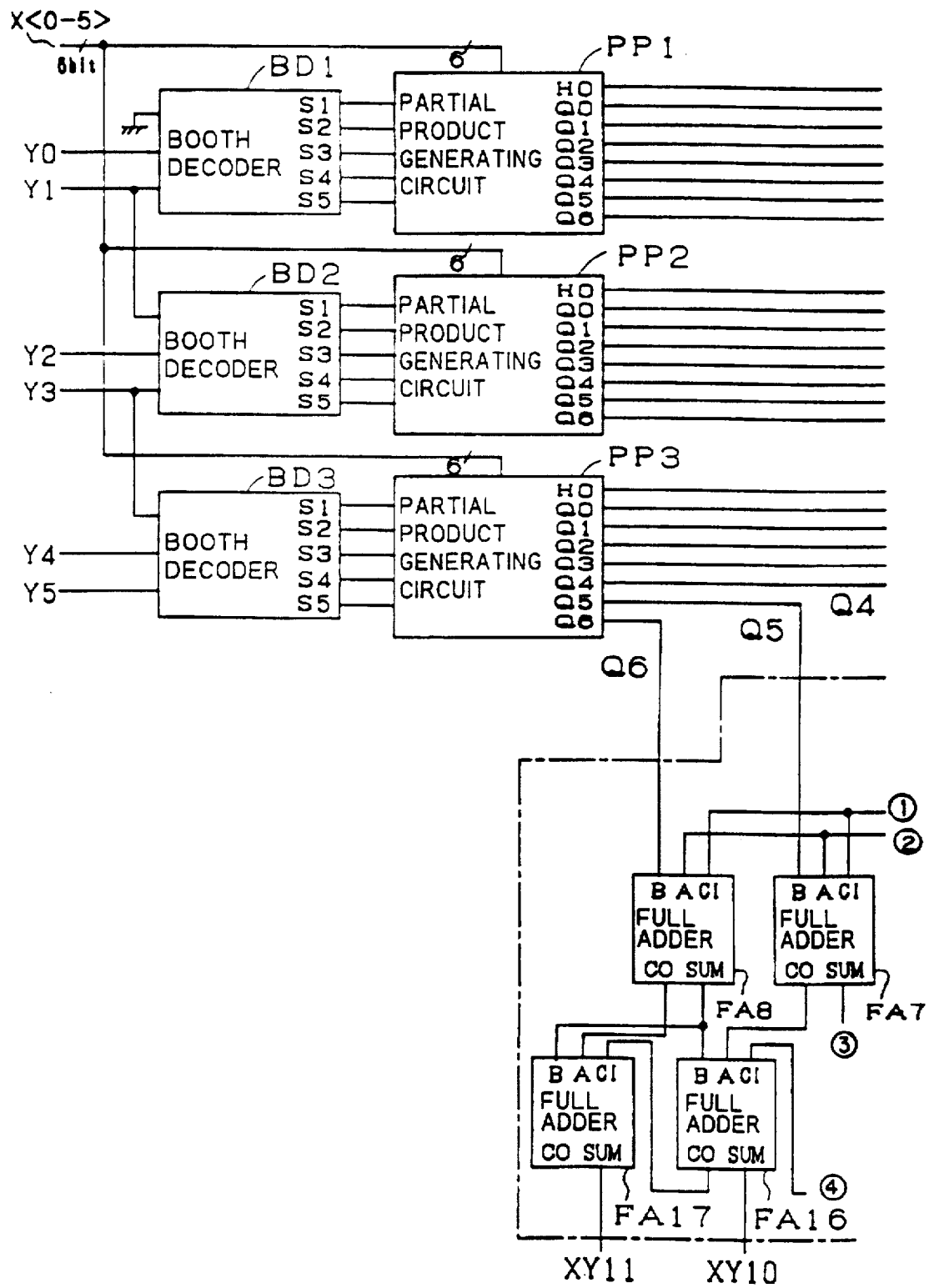
FIG. 7 is a circuit diagram showing the internal configuration of the partial product adder circuit of FIG. 1.
Figure 8:
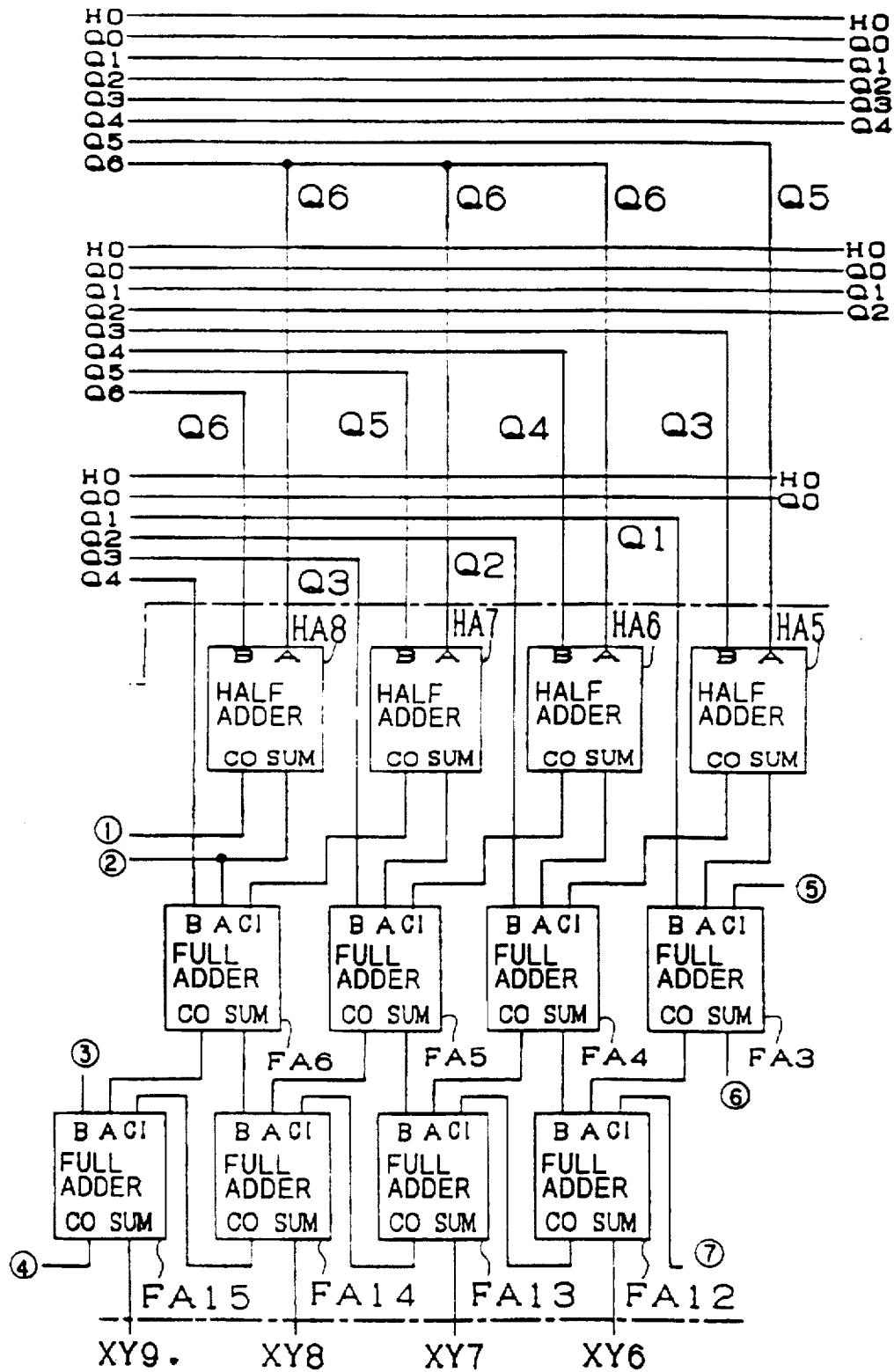
FIG. 8 is a circuit diagram showing the internal configuration of the partial product adder circuit of FIG. 1.
Figure 9:
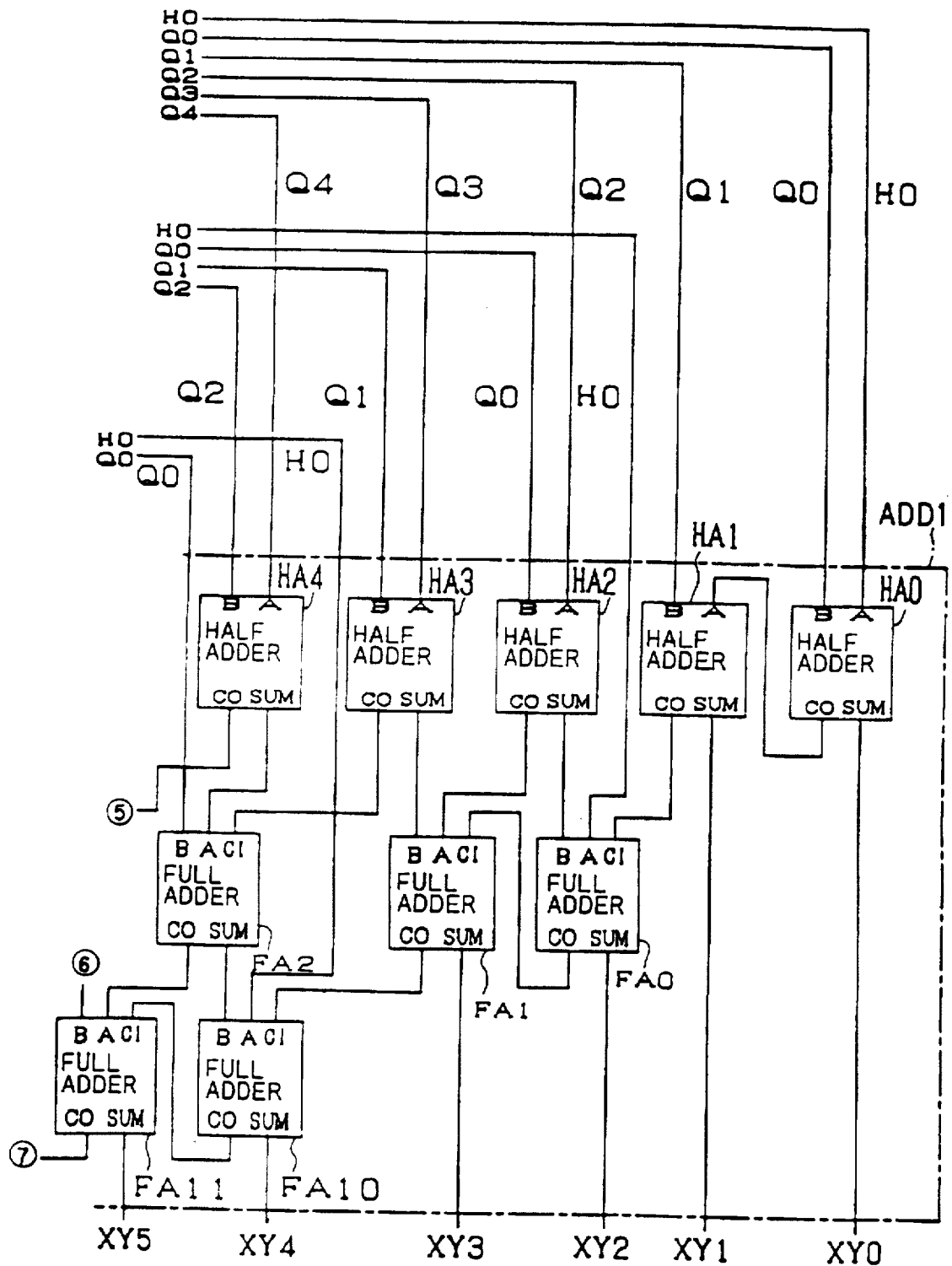
FIG. 9 is a circuit diagram showing the internal configuration of the partial product adder circuit of FIG. 1.

FIG. 7, FIG. 8 and FIG. 9 are circuit diagrams showing the internal configuration of the partial product adder circuit ADD1 and the configuration around it. For convenience in description, it shows the case of the multiplicand X of 6-bit X0-X5. Accordingly, the partial products SM outputted from the partial product generating circuits PP1-PP3 are the inversion bit information H0, the 1-bit partial products Q0-Q6. As shown in FIG. 7, FIG. 8 and FIG. 9, the partial product adder circuit ADD1 is formed of half adders HA0-HA8, full adders FA0-FA8, and FA10-FA17.

The half adder HA0 receives the inversion bit information H0 of the partial product generating circuit PP1 at the first input A, receives the 1-bit partial product Q0 of the partial product generating circuit PP1 at the second input B, and the carrier output CO is connected to the first input A of the half adder HA1, and the add output SUM is outputted as a 1-bit multiplication result XY0.

The half adder HA1 receives the 1-bit partial product Q1 of the partial product generating circuit PP1 at the second input B, and the carrier output CO is outputted to the carrier input CI of the full adder FA0, and the add output SUM is outputted as a 1-bit multiplication result XY1.

The half adder HA2 receives the Q2 of the partial product generating circuit PP1 at the first input A, receives the 1-bit partial product Q0 of the partial product generating circuit PP2 at the second input B, and the carrier output CO is connected to the first input A of the full adder FA1, and the add output SUM is connected to the second input B of the full adder FA0.

The half adder HAi (i=3-6) receives Qi of the partial product generating circuit PP1 at the first input A, receives the 1-bit partial product Q(i-2) of the partial product generating circuit PP2 at the second input B, and the carrier output CO is connected to the carrier input CI of the full adder FA(i-1), and the add output SUM is connected to the first input A (the second input B of the FA1 only) of the full adder FA(i-2).

The half adder HA7 receives the 1-bit partial product Q6 of the partial product generating circuit PP1 at the first input A, receives the 1-bit partial product Q5 of the partial product generating circuit PP2 at the second input B, and the carrier output CO is connected to the carrier input CI of the full adder FA6, and the add output SUM is connected to the first input A of the full adder FA5.

The half adder HA8 receives the 1-bit partial product Q6 of the partial product generating circuit PP1 at the first input A, receives the 1-bit partial product Q6 of the partial product generating circuit PP2 at the second input B, and the carrier output CO is connected to the carrier inputs CI of the full adders FA7 and FA8, and the add output SUM is connected to the first inputs A of the full adders FA6-FA8.

The full adder FA0 receives the inversion bit information H0 of the partial product generating circuit PP2 at the first input A, and the carrier output CO is connected to the carrier input CI of the full adder FA1 and the add output SUM is outputted as the 1-bit multiplication result XY2.

The full adder FA1 has its carrier output CO connected to the carrier input CI of the full adder FA10 and its add output SUM outputted as the 1-bit multiplication result XY3.

The full adder FAi (i=2-6) receives the 1-bit partial product Q(i-2) of the partial product generating circuit PP3 at the second input B, and has its carrier output CO connected to the first input A of the full adder FA1(i-1) and its add output SUM connected to the second input B of the full adder FA1(i-2).

The full adder FA7 receives the 1-bit partial product Q5 of the partial product generating circuit PP3 at the second input B, and has its carrier output CO connected to the first input A of the full adder FA16 and its add output SUM connected to the second input B of the full adder FA15.

The full adder FA8 receives the 1-bit partial product Q6 of the partial product generating circuit PP3 at the second input B, and has its carrier output CO connected to the first input A of the full adder FA17 and its add output SUM connected to the second input B of the full adder FA16.

The full adder FA10 receives the inversion bit information H0 of the partial product generating circuit PP3 at the first input A, and has its carrier output CO connected to the carrier input CI of the full adder FA11 and its add output SUM outputted as the 1-bit multiplicand result XY4.

The full adder FA1i (i=1-6) has its carrier output CO connected to the full adder FA1(i+1) and has its add output SUM outputted as the 1-bit multiplicand result XY(i+4).

The add output SUM of the full adder FA17 is outputted as the 1-bit multiplication result XY11.

The partial product adder circuit ADD1 with such a structure performs an add processing of the partial products SM1-SM3 (H0, Q0-Q6) outputted from the partial product generating circuits PP1-PP3 using the half adders HA0-HA8, the full adders FA0-FA8, FA10-FA17 to output the multiplication result XY (XY0-XY11) of the multiplier Y (Y0-Y5) and the multiplicand X (X0-X5).

Figure 22:
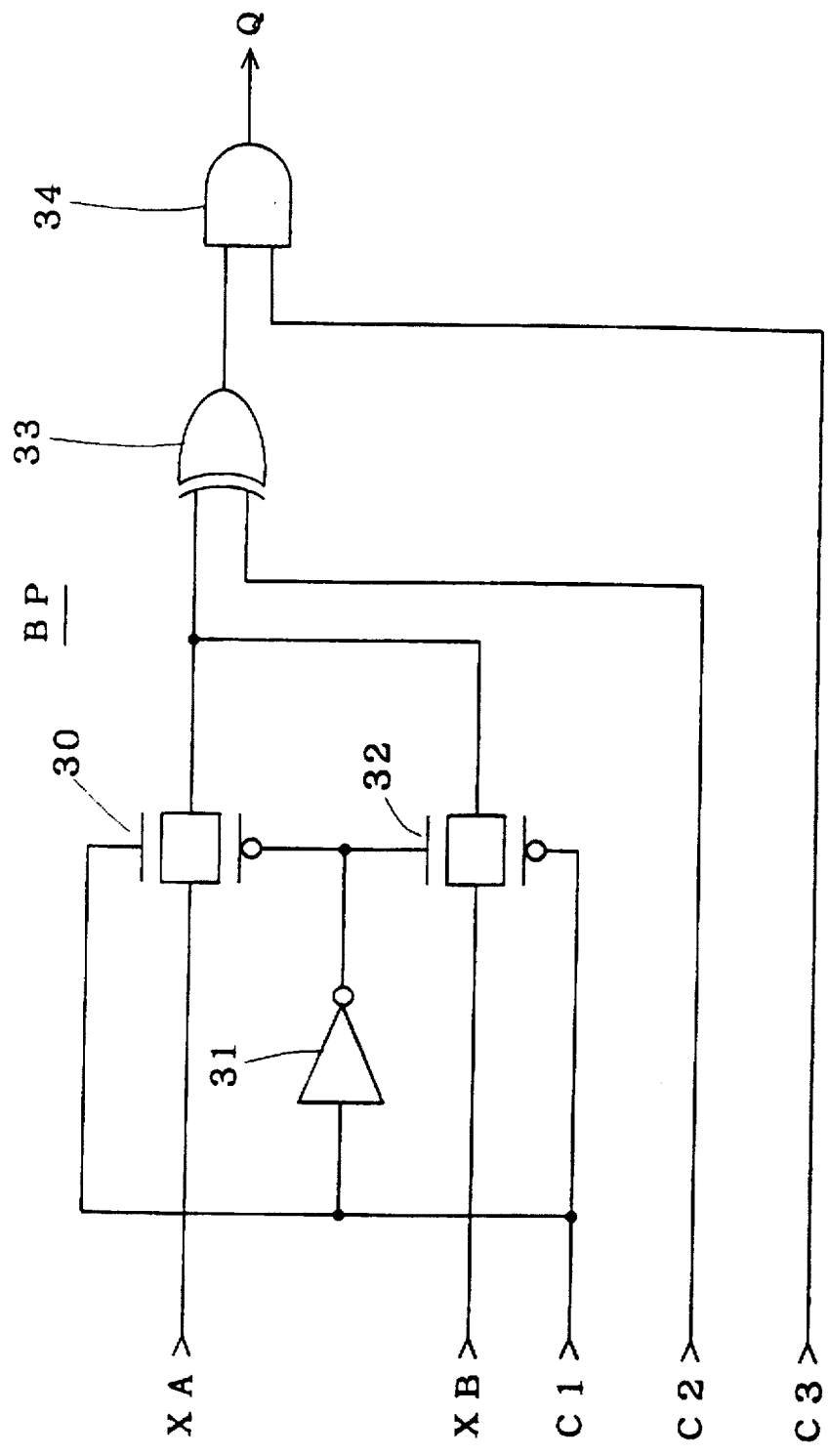
FIG. 22 is a circuit diagram showing the internal configuration of the 1-bit partial product generating circuit in the partial product generating circuit.

The multiplier circuit of the first preferred embodiment with such a structure, by forming the Booth decoders BD which output the 5-bit partial product information groups S1-S5, has enabled the circuit configuration of each 1-bit partial product generating circuit BP in the partial product generating circuits PP with four transfer gates, one NMOS transistor and two inverters, as shown in FIG. 6. This circuit configuration can be realized with a rather simpler circuit configuration as compared with the circuit configuration of the conventional 1-bit partial product generating circuit shown in FIG. 22.

Accordingly, in the multiplier circuit of the first preferred embodiment, the number of required 1-bit partial product generating circuits BP is (YN/2)×(XN+1), where YN is the number of bits of the multiplier Y and XN is the number of bits of the multiplicand X, as in the conventional case, but the configuration of each 1-bit partial product generating circuit BP is simplified and the circuit scale of the multiplier circuit can be considerably reduced.

<<Second Preferred Embodiment>>

Figure 10:
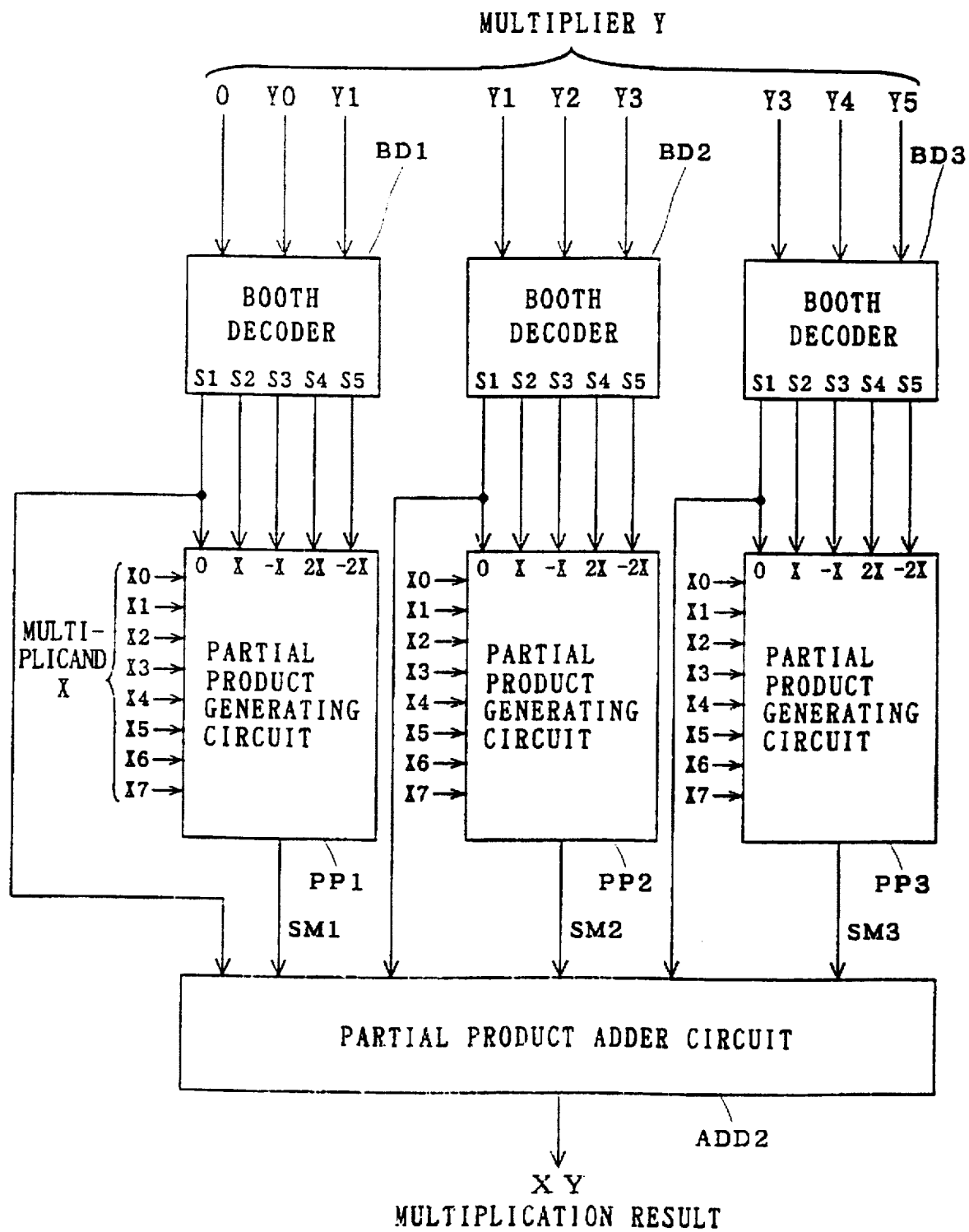
FIG. 10 is a block diagram showing the configuration of a multiplier circuit according to a second preferred embodiment of the present invention.

FIG. 10 is a block diagram showing the structure of a multiplier circuit of a second preferred embodiment of the present invention which realizes the Booth's algorithm.

Booth decoders BD1-BD3, as in the first preferred embodiment, receive overlapping three bits of a 6-bit multiplier Y (Y0-Y5) and output the partial product information groups S1-S5 to the partial product generating circuits PP1-PP3 on the basis of the received three bits of the multiplier Y, and they also output the partial product information S1 of each to a partial product adder circuit ADD2.

The partial product generating circuits PP1-PP3 respectively receive the partial product information groups S1-S5 from the Booth decoders BD1-BD3 and the 8-bit multiplicand X (X0-X7), and output the partial products SM1-SM3 to the partial product adder circuit ADD2.

The partial product adder circuit ADD2 efficiently adds the SM1-SM3 on the basis of the partial product information S1 and outputs the multiplication result XY of the multiplier Y and the multiplicand X.

Figure 11:
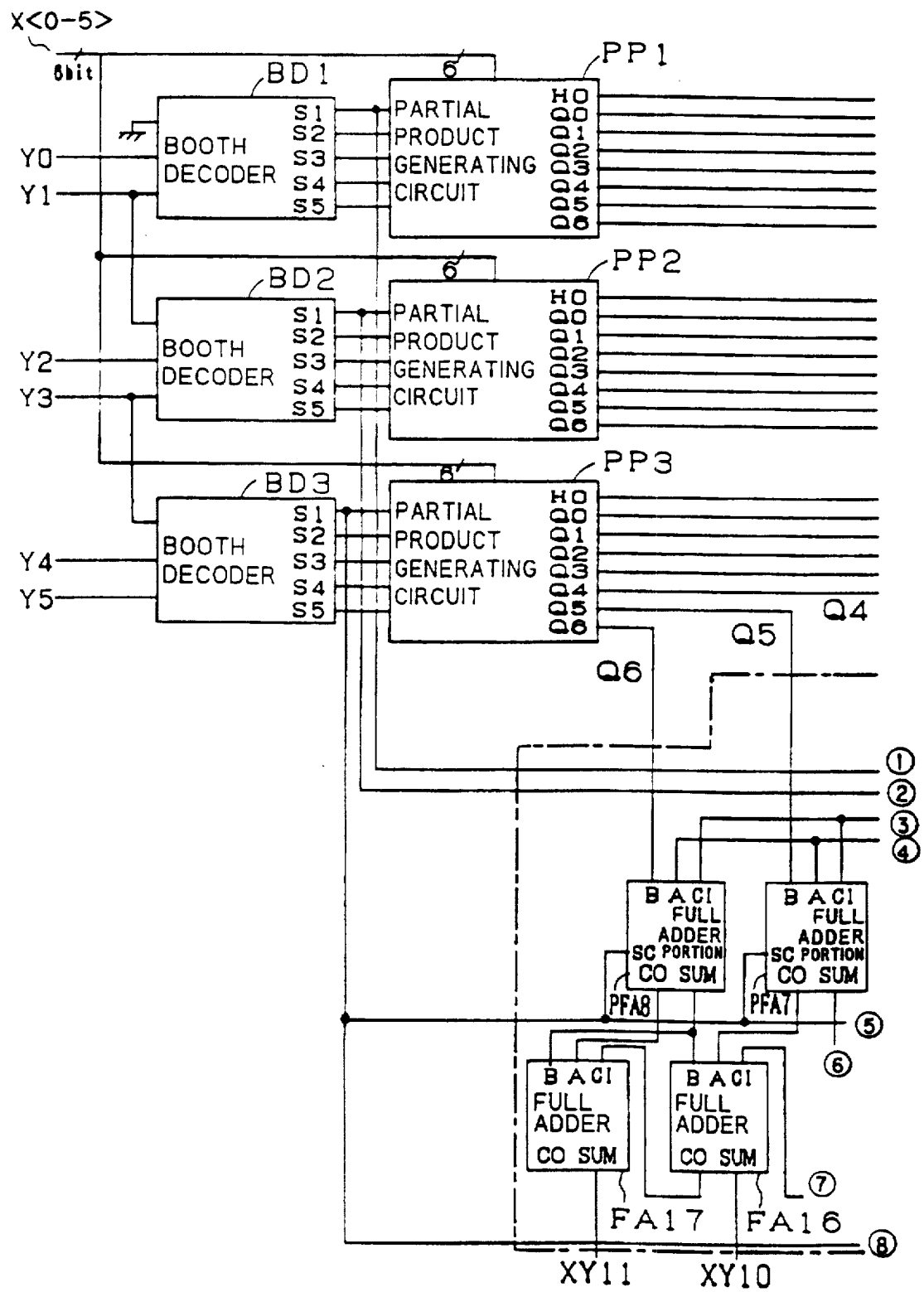
FIG. 11 is a circuit diagram showing the internal configuration of the partial product adder circuit of FIG. 10.
Figure 12:
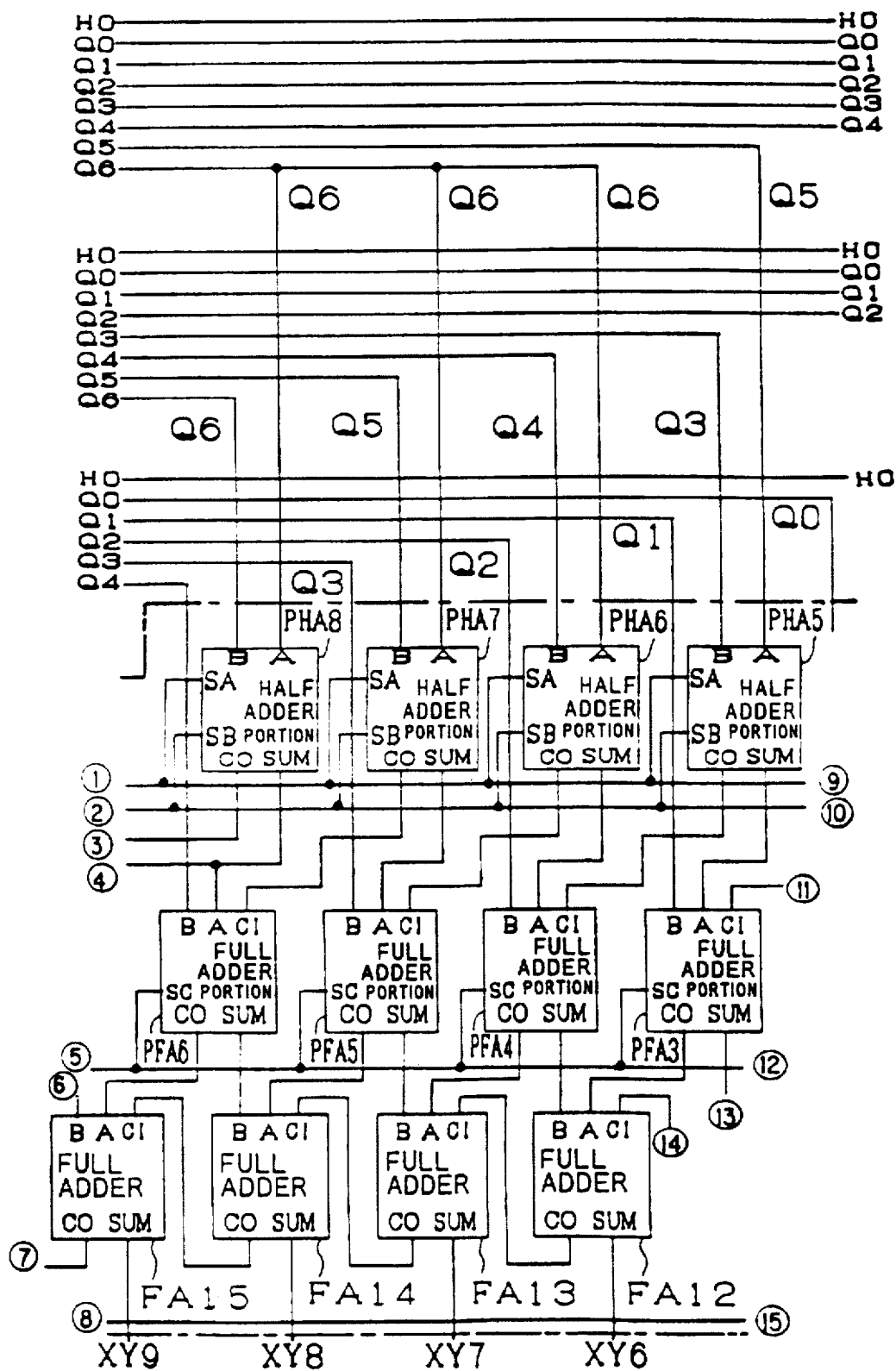
FIG. 12 is a circuit diagram showing the internal configuration of the partial product adder circuit of FIG. 10.
Figure 13:
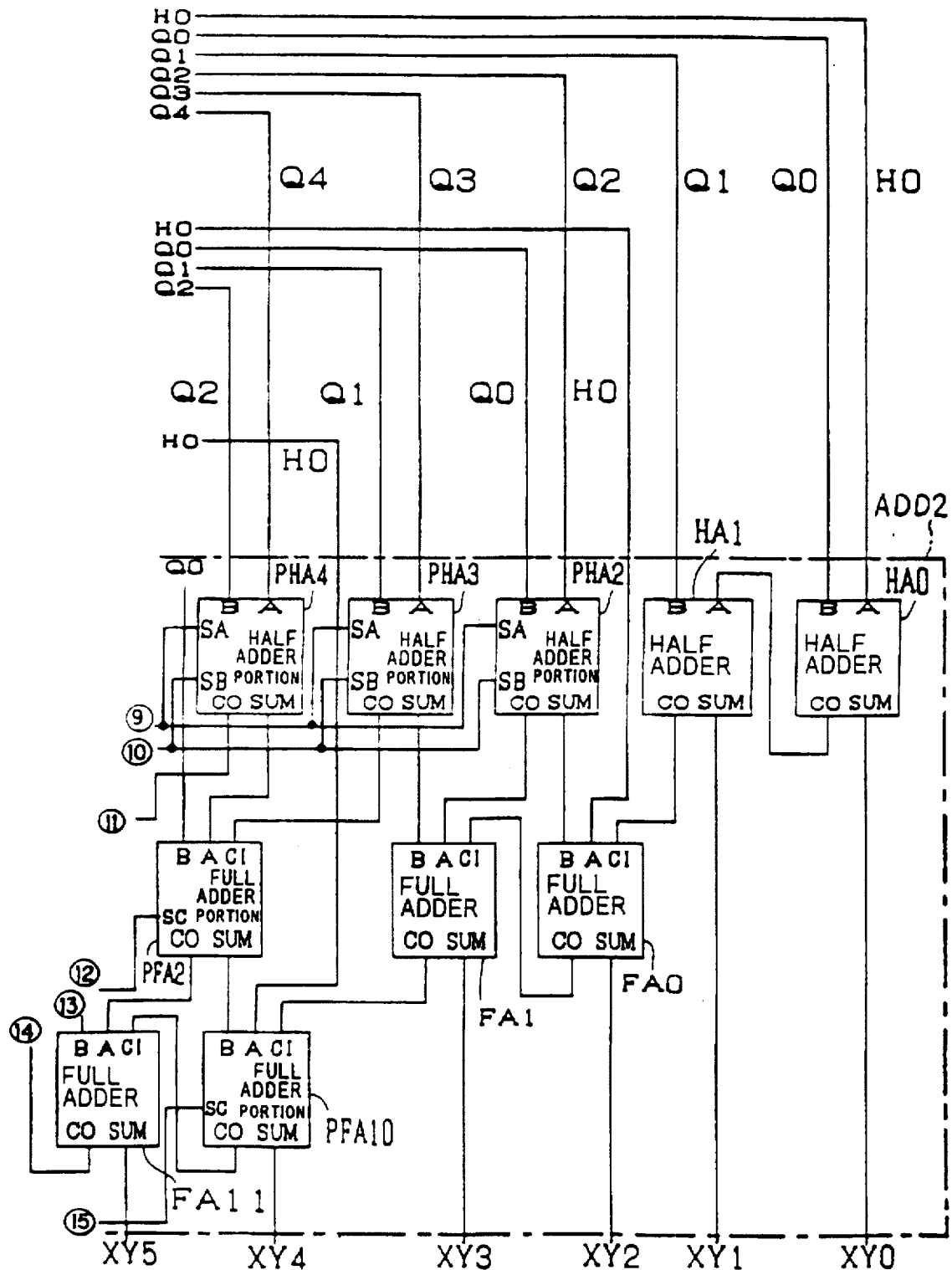
FIG. 13 is a circuit diagram showing the internal configuration of the partial product adder circuit of FIG. 10.

FIG. 11, FIG. 12, and FIG. 13 are circuit diagrams showing the internal configuration of the partial product adder circuit ADD2 in the multiplier circuit according to the second preferred embodiment of the present invention and the configuration around it. For convenience in description, it shows the case of the multiplicand X of 6 bits X0-X5. Accordingly, the partial products SM outputted from the partial product generating circuits PP1-PP3 are the inversion bit information H0, the 1-bit partial products Q0-Q6. As shown in FIG. 11, FIG. 12 and FIG. 13, the partial product adder circuit ADD2 is formed of half adders HA0, HA1, full adders FA0, FA1, FA11-FA17, and half adder portions PHA2-PHA7, and full adder portions PFA2-PFA8 and PFA10.

The half adder HA0 receives the inversion bit information H0 of the partial product generating circuit PP1 at the first input A, receives the 1-bit partial product Q0 of the partial product generating circuit PP1 at the second input B, and the carrier output CO is connected to the first input A of the half adder HA1, and the add output SUM is outputted as a 1-bit multiplication result XY0.

The half adder HA1 receives the 1-bit partial product Q1 of the partial product generating circuit PP1 at the second input B, and the carrier output CO is outputted to the carrier input CI of the full adder FA0, and the add output SUM is outputted as a 1-bit multiplication result XY1.

The half adder portion PHA2 receives the Q2 of the partial product generating circuit PP1 at the first input A, receives the 1-bit partial product Q0 of the partial product generating circuit PP2 at the second input B, receives the partial product information S1 (S1-1) from the Booth decoder BD1 at the partial product information input SA, and receives the partial product information S1 (S1-2) from the Booth decoder BD2 at the partial product information input SB, and the carrier output CO is connected to the first input A of the full adder FA1, and the add output SUM is connected to the second input B of the full adder FA0.

The half adder portion PHAi (i=3–6) receives Qi of the partial product generating circuit PP1 at the first input A, receives the 1-bit partial product Q(i–2) of the partial product generating circuit PP2 at the second input B, receives the partial product information S1-1 at the partial product information input SA, and receives the partial product information S1-2 at the partial product information inputs B, and the carrier output CO is connected to the carrier input CI of the full adder portion PFA(i–1), and the add output SUM is connected to the first input A of the full adder portion PFA(i–2). The add output SUM of the full adder portion PFA3 is, however, connected to the second input B of the full adder FA1.

The half adder portion PHA7 receives the 1-bit partial product Q6 of the partial product generating circuit PP1 at the first input A, receives the 1-bit partial product Q5 of the partial product generating circuit PP2 at the second input B, receives the partial product information S1-1 at the partial product information input SA, and receives the partial product information S1-2 at the partial product information input SB, and the carrier output CO is connected to the carrier input CI of the full adder portion PFA6, and the add output SUM is connected to the first input A of the full adder portion PFA5.

The half adder portion PHA8 receives the 1-bit partial product Q6 of the partial product generating circuit PP1 at the first input A, receives the 1-bit partial product Q6 of the partial product generating circuit PP2 at the second input B, receives the partial product information S1-1 at the partial product information input SA and receives the partial product information S1-2 at the partial product information input SB, and the carrier output CO is connected to the carrier inputs CI of the full adder portions PFA7 and PFA8, and the add output SUM is connected to the first inputs A of the full adder portions PFA6–PFA8.

The full adder FA0 receives the inversion bit information H0 of the partial product generating circuit PP2 at the first input A, and the carrier output CO is connected to the carrier input CI of the full adder FA1 and the add output SUM is outputted as the 1-bit multiplication result XY2.

The full adder FA1 has its carrier output CO connected to the carrier input CI of the full adder portion PFA10 and its add output SUM outputted as the 1-bit multiplication result XY3.

The full adder portion PFAi (i=2–6) receives the 1-bit partial product Q(i–2) of the partial product generating circuit PP3 at the second input B, and receives the partial product information S1 (S1-3) from the Booth decoder BD3 at the partial product information input SC, and has its carrier output CO connected to the first input A of the full adder FA1(i–1) and its add output SUM connected to the second input B of the full adder FA1(i–2). However, the add output SUM of the full adder portion PFA2 is connected to the second input B of the full adder portion PFA10.

The full adder portion PFA7 receives the 1-bit partial product Q5 of the partial product generating circuit PP3 at the second input B, and receives the partial product information S1-3 at the partial product information input SC, and has its carrier output CO connected to the first input A of the full adder FA16 and its add output SUM connected to the second input B of the full adder FA15.

The full adder portion PFA8 receives the 1-bit partial product Q6 of the partial product generating circuit PP3 at the second input B, and receives the partial product information S1-3 at the partial product information input SC, and has its carrier output CO connected to the first input A of the full adder FA17 and its add output SUM connected to the second input B of the full adder FA16.

The full adder portion PFA10 receives the inversion bit information H0 of the partial product generating circuit PP3 at the first input A, and has its carrier output CO connected to the carrier input CI of the full adder FA11 and its add output SUM outputted as the 1-bit multiplicand result XY4.

The full adder FA1$i$(i=1–6) has its carrier output CO connected to the full adder FA1(i+1) and has its add output SUM outputted as the 1-bit multiplication result XY(i+4).

The add output SUM of the full adder FA17 is outputted as the 1-bit multiplication result XY11.

Figure 14:
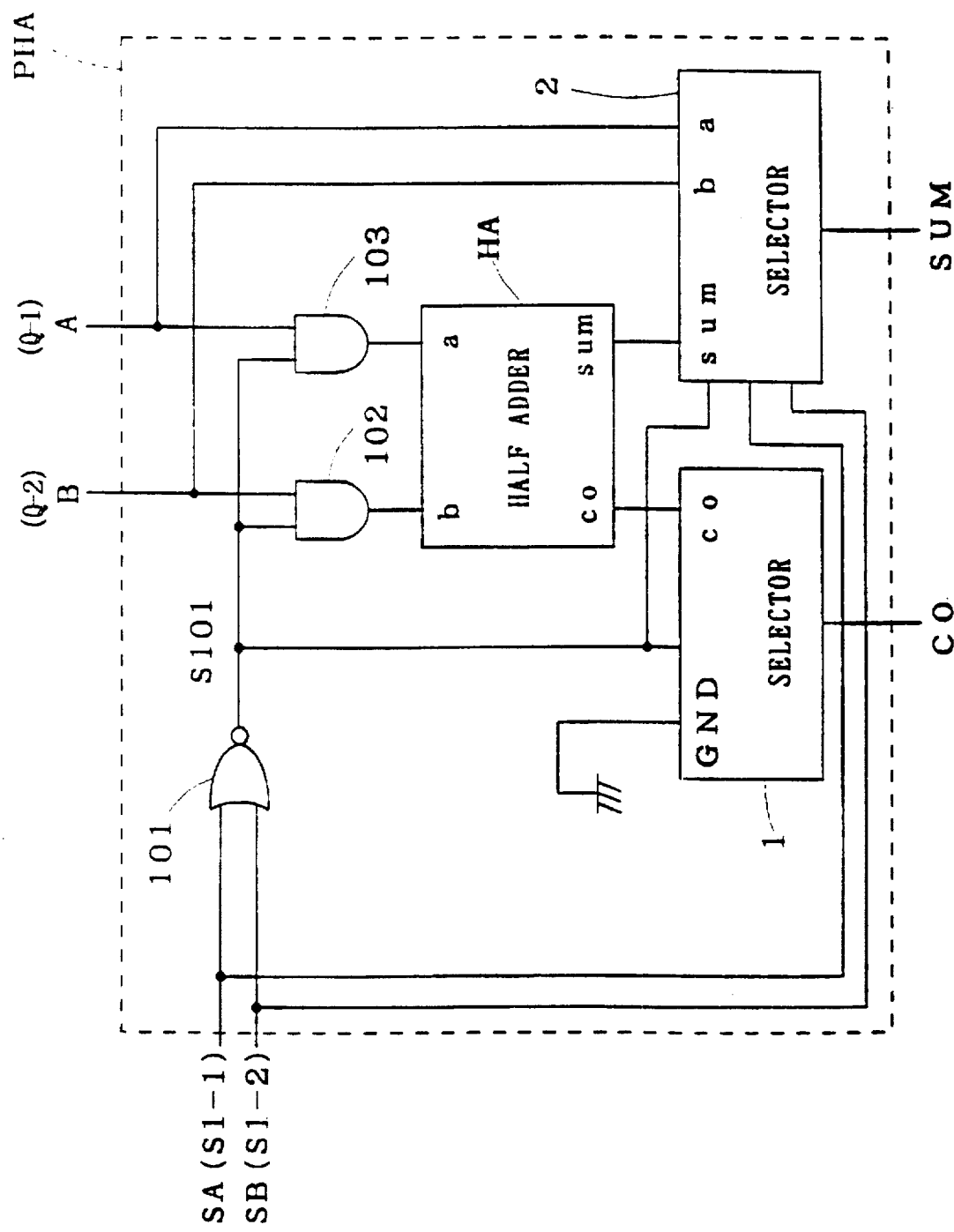
FIG. 14 is a circuit diagram showing the internal configuration of a half adder portion.

FIG. 14 is a circuit diagram showing the internal configuration of the half adder portion PHA (PHA2–PHA8). As shown in the figure, the half adder portion PHA includes a NOR gate 101, AND gates 102, 103, a half adder HA, and a selector 1 and a selector 2.

The NOR gate 101 receives the partial product information S1-1 and the partial product information S1-2 at its one input and the other input, and the output of the NOR gate 101 is connected to one inputs of the AND gates 102 and 103 and is also provided to the selector 1 and the selector 2 as a control signal S101.

The AND gate 102 receives the 1-bit partial product Q-2 from the partial product generating circuit PP2 at its other input, and its output is connected to the second input b of the half adder HA. The AND gate 103 receives the 1-bit partial product Q-1 from the partial product generating circuit PP1 at its other input and its output is connected to the first input a of the half adder HA.

Accordingly, when at least one of the partial product information S1-1 and the partial product information S1-2 indicates "1", the output of the NOR gate 101 goes "0" and the outputs of the AND gates 102 and 103 are fixed to "0". At this time, the half adder HA does not operate effectively.

The half adder HA adds the 1-bit partial product Q-1 and the 1-bit partial product Q-2 when the control signal S101 is at "1" and outputs a carrier output co and an add output sum.

The selector 1 receives the GND input at the ground level and the carrier output co of the half adder HA and outputs the carrier output co as the carrier output CO when both the partial product information S1-1 and the partial product information S1-2 are "0" on the basis of the control signal S101, and otherwise outputs "0" as the carrier output CO.

The selector 2 receives the add output sum, the 1-bit partial product Q-2 and the 1-bit partial product Q-1, and on the basis of the control signal S101, the partial product information S1-1 and the partial product information S1-2, outputs the add output sum as the add output SUM when both the partial product information S1-1 and the partial product information S1-2 are at "0", outputs the 1-bit partial product Q-2 as the add output SUM when the partial product information S1-1 is "1" (the partial product SM1 is "0"), and outputs the 1-bit partial product Q-1 as the add output SUM when only the partial product information S1-2 is "1" (only the partial product SM2 is "0").

This way, the half adder portions PHA2–PHA8 of the second preferred embodiment fix the first input a and the second input b of the half adder HA to "0" when at least one of the partial product information S1-1 and the partial product information S1-2 is "1" to stop the effective operation of the half adder HA, select the ground level with the selector 1, and select one of the first input A (Q-2) and the second input B (Q-1) whose partial product is not "0" with the selector 2 to perform a half add operation.

Figure 15:
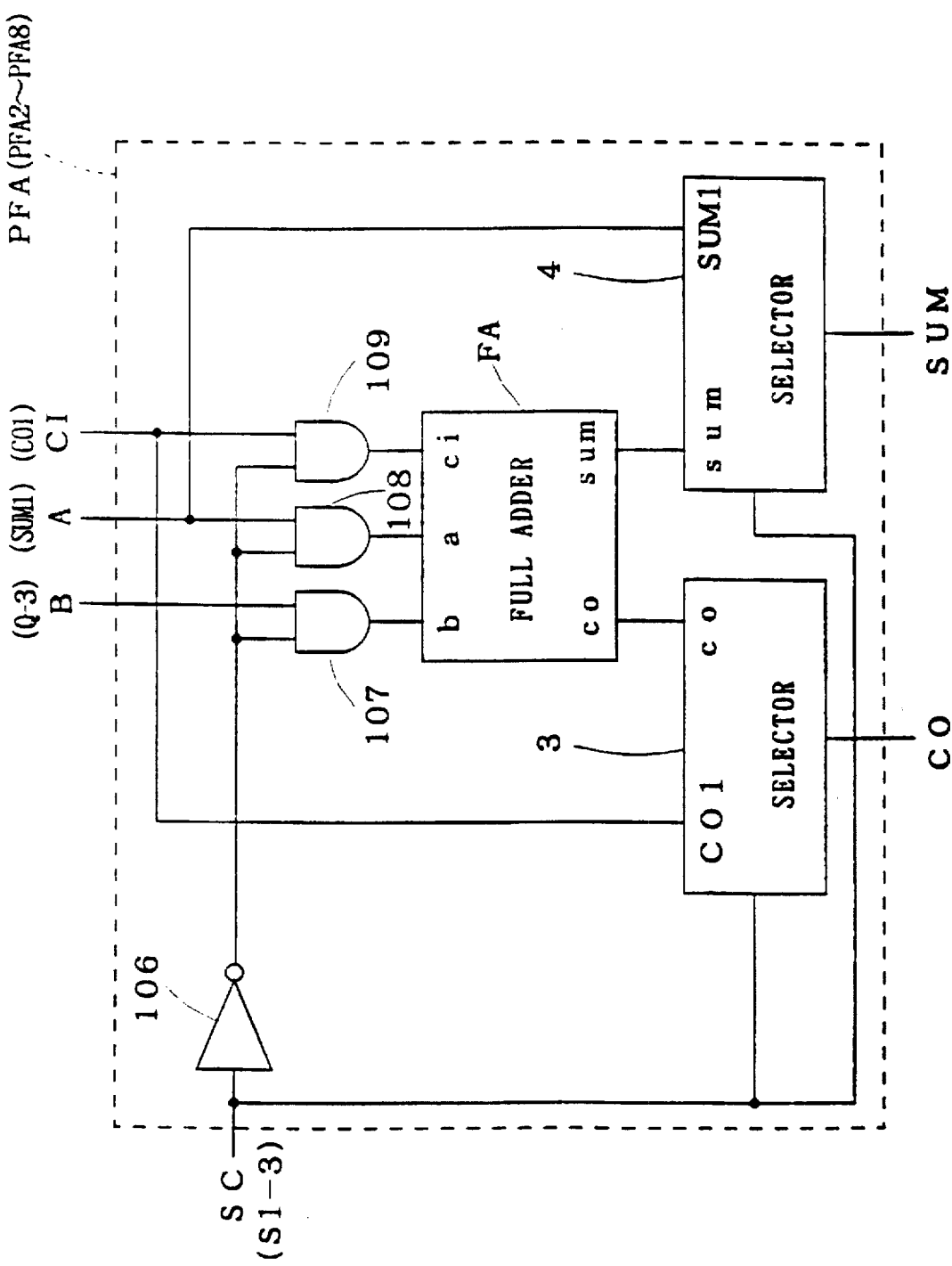
FIG. 15 is a circuit diagram showing the (first) internal configuration of a full adder portion.

FIG. 15 is a circuit diagram showing the internal configuration of the full adder portion PFA (PFA2–PFA8). As shown in the figure, the full adder portion PFA is formed of an inverter 106, AND gates 107–109, a full adder FA, and a selector 3 and a selector 4.

The inverter 106 receives the partial product information S1-3 at its input and the output of the inverter 106 is connected to one inputs of the AND gates 107–109.

The AND gate 107 receives the 1-bit partial product Q-3 from the partial product generating circuit PP3 at its other input, and its output is connected to the second input b of the full adder FA. The AND gate 108 receives the add output SUM1 from the half adder portion PHA at its other input, and its output is connected to the first input a of the full adder FA. The AND gate 109 receives the carrier output CO1 from the half adder portion PHA at its other input, and its output is connected to the carrier input ci of the full adder FA.

Accordingly, when the partial product information S1-3 indicates "1", the output of the inverter 106 goes "0" and the outputs of the AND gates 107–109 are fixed to "0". At this time, the full adder FA does not operate effectively.

The full adder FA performs the full add processing of the 1-bit partial product Q-3 and the add output SUM1 when the carrier input is the carrier output CO1 when the output of the inverter 106 is "1", that is, when the partial product information S1-3 is "0", and outputs the carrier output co and the add output sum.

The selector 3 receives the carrier output CO1 and the carrier output co of the full adder FA and, on the basis of the partial product information S1-3, outputs the carrier output co as the carrier output CO when it is "0" and outputs the carrier output CO1 as the carrier output CO when the partial product information S1-3 is "1" (when the partial product SM3 is "0").

The selector 4 receives the add output sum and the add output SUM1 and, on the basis of the partial product information S1-3, outputs the add output sum as the add output SUM when the partial product information S1-3 is "0" and outputs the add output SUM1 as the add output SUM when the partial product information S1-3 is "1".

This way, the full adder portions PFA2–PFA8 of the second preferred embodiment fix the first input a, the second input b and the carrier input ci of the full adder FA to "0" when the partial product information S1-3 is "1" to stop the effective operation of the full adder FA, and select the carrier output CO1 with the selector 3 and select the add output SUM1 with the selector 4 to perform the full addition operation.

Figure 16:
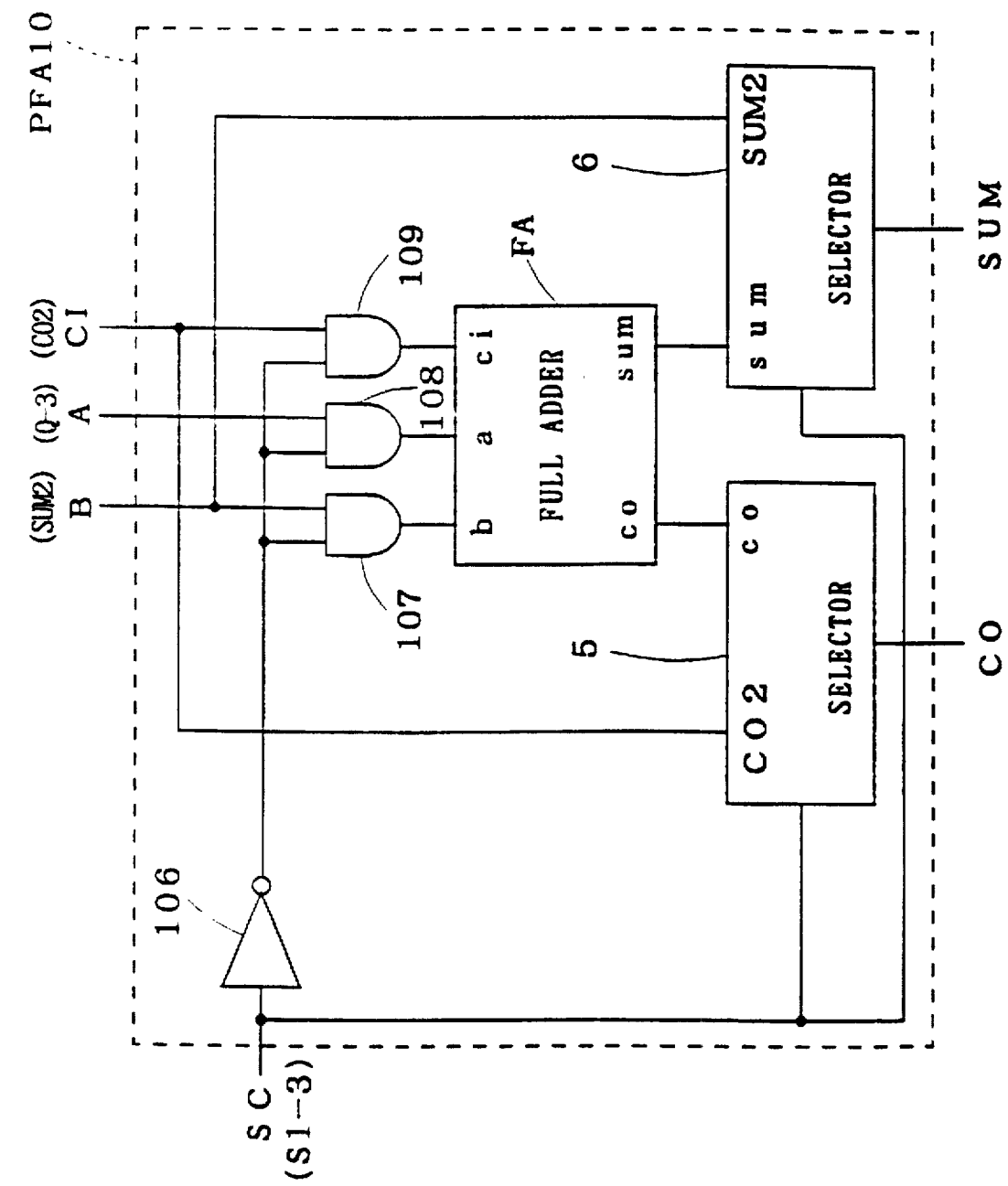
FIG. 16 is a circuit diagram showing the (second) internal configuration of a full adder.

FIG. 16 is a circuit diagram showing the internal configuration of the full adder portion PFA10. As shown in the figure, the full adder portion PFA is formed of an inverter 106, AND gates 107–109, a full adder FA, a selector 5 and a selector 6.

The inverter 106 receives the partial product information S1–3 at its input, and the output of the inverter 106 is connected to one inputs of the AND gates 107–109.

The AND gate 107 receives the add output SUM2 from the full adder portion PFA2 at its other input, and its output is connected to the second input b of the full adder FA. The AND gate 108 receives the 1-bit partial product Q-3 from the partial product generating circuit PP3 at its other input, and its output is connected to the first input a of the full adder FA. The AND gate 109 receives the carrier output CO2 from the full adder FA1 at its other input, and its output is connected to the carrier input ci of the full adder FA.

Accordingly, in the full adder portion PFA10, as in the full adder portions PFA2–PFA8, the output of the inverter 106 goes "0" when the partial product information S1-3 indicates "1" and the outputs of the AND gates 107–109 are fixed to "0". At this time, the full adder FA does not operate effectively.

The full adder FA performs the full add processing of the 1-bit partial product Q-3 and the add output SUM2 when the carrier input is the carrier output CO2 when the output of the inverter 106 is "1", that is, when the partial product information S1-3 is "0", and outputs the carrier output co and the add output sum.

The selector 5 receives the carrier output CO2, and the carrier output co of the full adder FA and, on the basis of the partial product information S1-3, outputs the carrier output co as the carrier output CO when it is "0", and outputs the carrier output CO2 as the carrier output CO when the partial product information S1-3 is "1".

The selector 6 receives the add output sum and the add output SUM2 and, on the basis of the partial product information S1-3, outputs the add output sum as the add output SUM when the partial product information S1-3 is "0", and outputs the add output SUM2 as the add output SUM when the partial product information S1-3 is "1".

This way, the full adder portion PFA10 of the second preferred embodiment fixes the first input a, the second input b and the carrier input ci of the full adder FA to "0" when the partial product information S1-3 is "1" to stop the effective operation of the full adder FA, and selects the carrier output CO2 with the selector 5 and selects the add output SUM2 with the selector 6 to perform the full add operation.

The partial product adder circuit ADD2 with such a structure performs the add processing of the partial products SM1–SM3 (H0, Q0–Q6) outputted from the partial product generating circuits PP1–PP3 using the half adders HA0, HA1, the full adders FA0, FA1, FA11–FA17, the half adder portions PHA2–PHA8 and the full adder portions PFA2–PFA8 and PFA10, and outputs the multiplication result XY (XY0–XY11) of the multiplier Y (Y0–Y5) and the multiplicand X (X0–X5).

The multiplier circuit of the second preferred embodiment with such a structure, by forming the Booth decoders BD which output the 5-bit partial product information groups S1–S5, as the first preferred embodiment, considerably simplifies the circuit configuration of each of the 1-bit partial product generating circuits BP in the partial product generating circuits PP to considerably reduce the circuit scale of the multiplier circuit.

Furthermore, the half adder portions PHA2–PHA8 in the partial product adder circuit ADD2 of the second preferred embodiment select the input other than the partial product of "0" and perform the half add operation without having the half adder HA effectively operate when the partial product information S1-1 or the partial product information S1-2 indicates "1" and operating the partial product SM1 or SM2 of "0", so that the half adder HA operates efficiently.

In addition, the full adder portions PFA2–PFA8 and PFA10 in the partial product adder circuit ADD2 of the second preferred embodiment select the input other than the partial product of "0" and perform the full add operation without having the full adder FA effectively operate when the partial product information S1-3 indicates "1" and operating the partial product SM3 of "0", so that the full adder FA efficiently operates.

That is to say, the partial product adder circuit ADD2 of the multiplier circuit of the second preferred embodiment selects input information other than partial products of "0" to obtain a multiplication result XY without effectively operating the adders (the half adders HA, the full adders FA) in the add processing of partial products of "0" obtained by multiplying the multiplicand X by 0 on the basis of the partial product information S1 (the partial product information S1-1—the partial product information S1-3), so that the half adders HA and the full adders FA in the partial product adder circuit ADD2 efficiently operate so as to reduce the power consumption.

<<Third Preferred Embodiment>>

Figure 17:
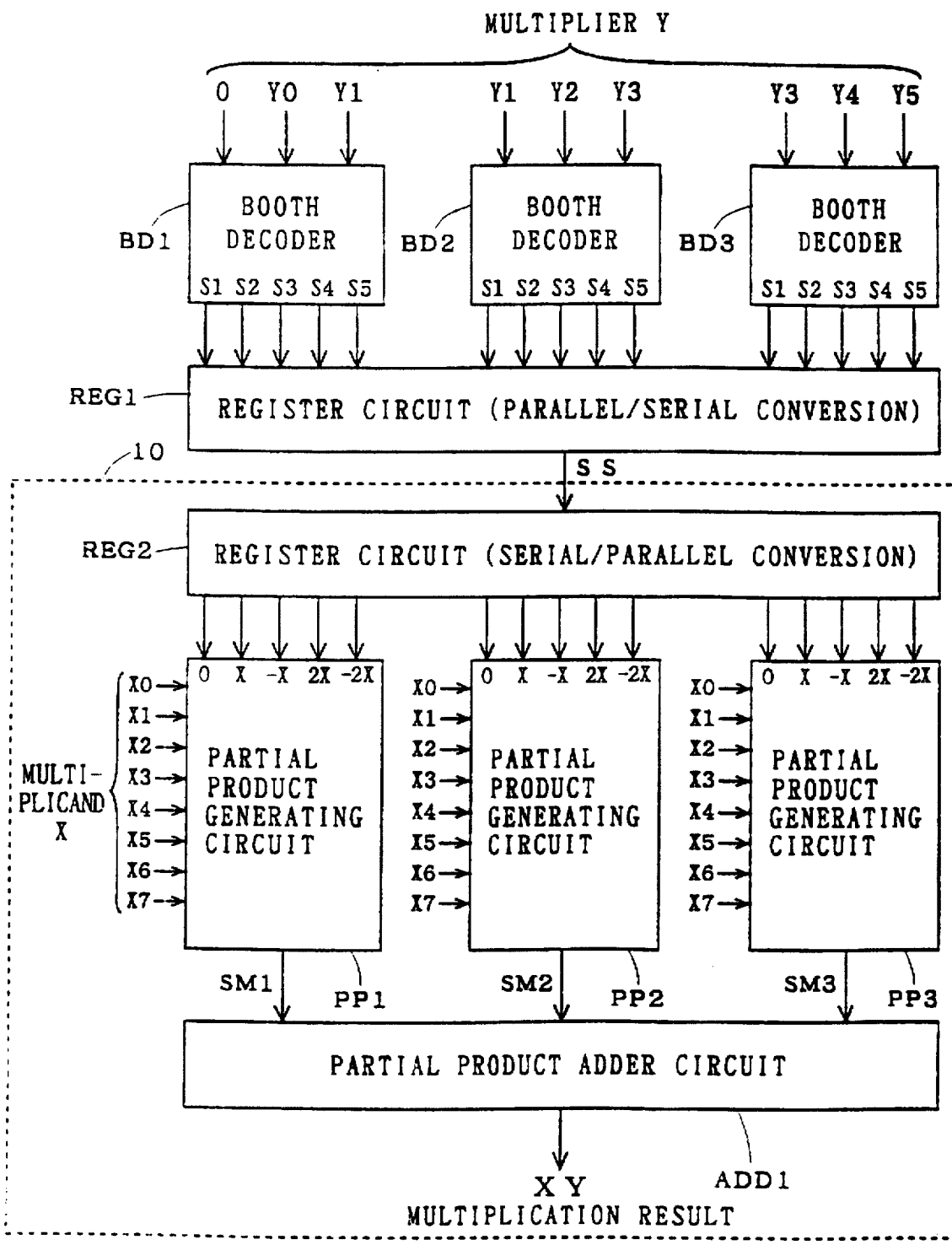
FIG. 17 is a block diagram showing the configuration of a multiplier circuit according to a third preferred embodiment of the present invention.
Figure 18:
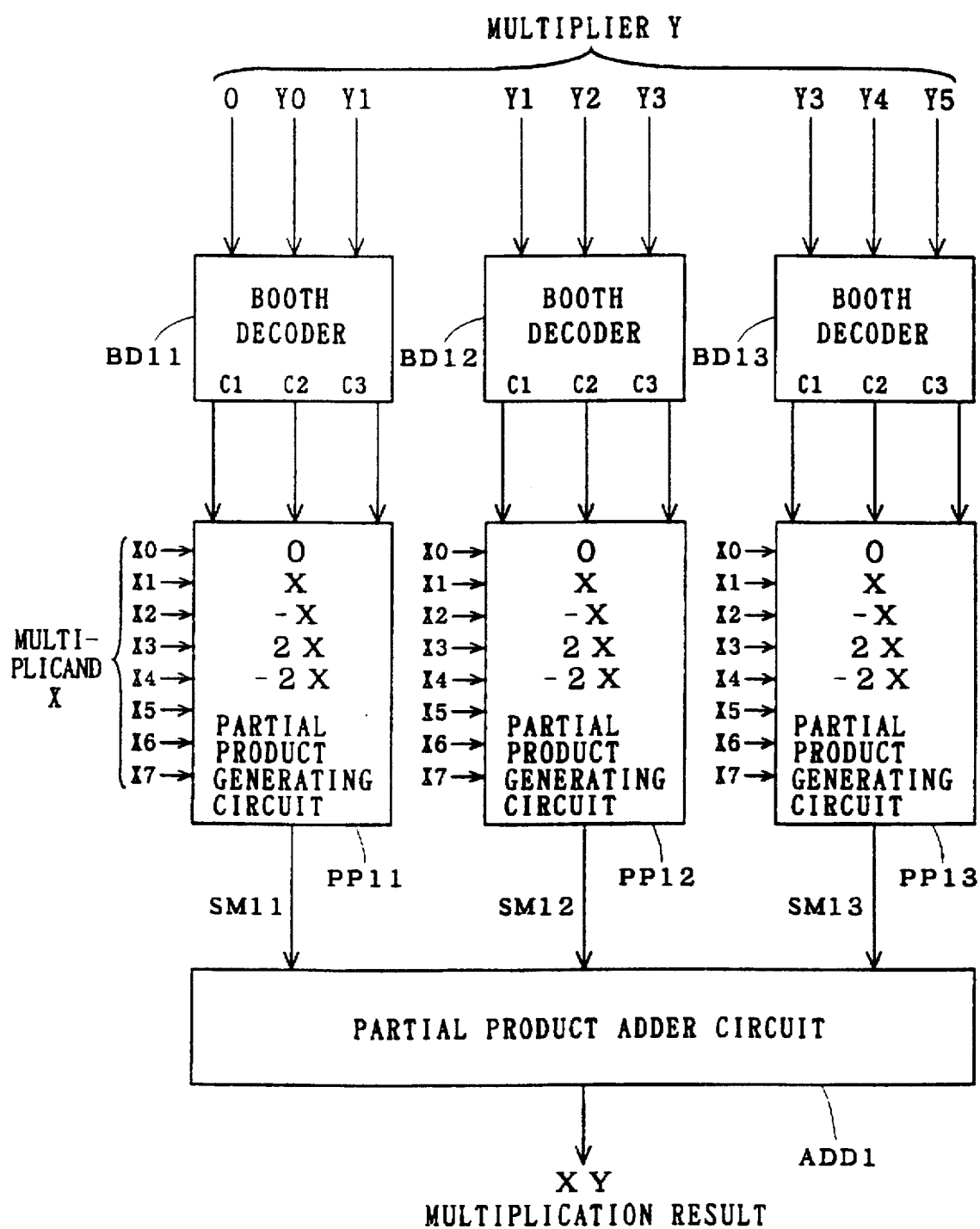
FIG. 18 is a block diagram showing the configuration of a conventional multiplier circuit.
Figure 19:
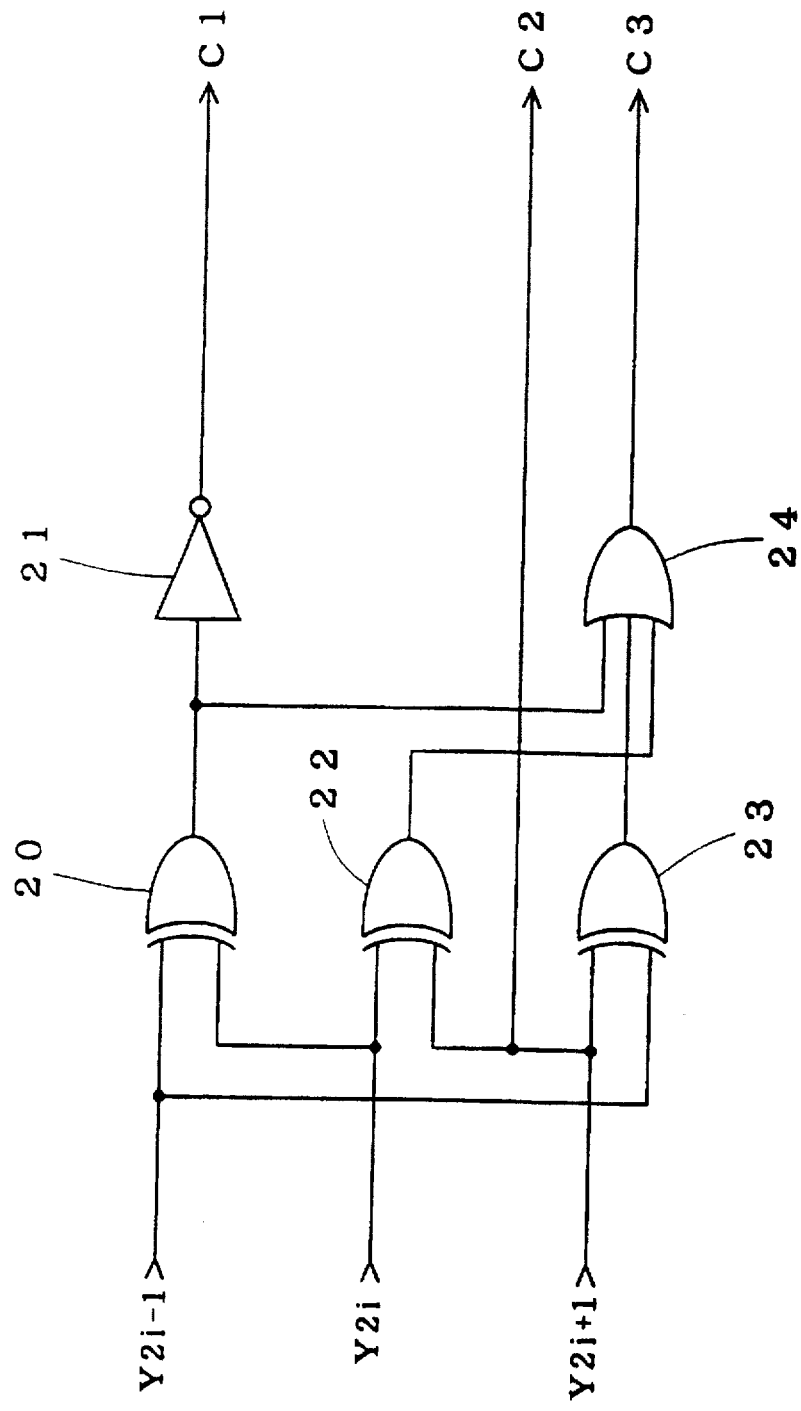
FIG. 19 is a circuit diagram showing the internal configuration of the Booth decoder of FIG. 18.

FIG. 17 is a block diagram showing the configuration of a multiplier circuit according to a third preferred embodiment of the present invention which realizes the Booth's algorithm.

The Booth decoders BD1–BD3 receive overlapping three bits of the 6-bit multiplier Y (Y0–Y5), respectively, and output the partial product information groups S1–S5 on the basis of the three bits of the multiplier Y to a register circuit REG1.

The register circuit REG1 receives the partial product information groups S1–S5 of the respective Booth decoders BD parallel, and parallel/serial converts to output serial partial product information SS to a register circuit REG2.

The register circuit REG2 receives the serial partial product information SS, serial/parallel converts the serial partial product information SS to output the partial product information groups S1–S5 of the respective Booth decoders BD to corresponding partial product generating circuits PP.

The partial product generating circuits PP1–PP3 respectively receive the corresponding partial product information groups S1–S5 and the 8-bit multiplicand X (X0–X7) and output partial products SM1–SM3 to the partial product adder circuit ADD1.

The partial product adder circuit ADD1 adds SM1–SM3 to output a multiplication result XY of the multiplier Y and the multiplicand X.

The multiplier circuit of the third preferred embodiment with such structure, by forming the Booth decoders BD which output the 5-bit partial product information groups S1–S5, as the first preferred embodiment, considerably simplifies the circuit configuration of each of the 1-bit partial product generating circuits BP in the partial product generating circuit PP to considerably reduce the circuit scale of the multiplier circuit.

In addition, by interposing the register circuit REG1 and the register circuit REG2 between the Booth decoders BD and the partial product generating circuits PP, the partial product information groups S1–S5 once obtained by the Booth decoders BD can be saved.

Accordingly, when multiplying a fixed multiplier Y and varying multiplicands X, if the register circuit REG2 once captures the serial partial product information SS, the multiplication processing can be applied by a simplified multiplier portion 10 formed of the register circuit REG2, the partial product generating circuits PP1–PP3 and the partial product adder circuit ADD1 in the following multiplication processing. As a result, the power consumption can be reduced, for the Booth decoders do not operate.

Also, if the simplified multiplier portion 10 is considered a multiplier circuit which receives the partial product information of the multiplier Y and the multiplicand X and performs multiplication of the multiplier Y and the multiplicand X, the circuit configuration of the simplified multiplier portion 10 is simplified because it does not include the Booth decoders BD inside, and the power consumption can be reduced because the partial product information groups S1–S5 are not obtained by Booth decoders BD.

Needless to say, the power consumption can further be reduced by replacing the partial product adder circuit ADD1 of the simplified multiplier portion 10 by the partial product adder circuit ADD2 of the second preferred embodiment.

While the invention has been described in detail, the foregoing description is in all aspects illustrative and not restrictive. It is understood that numerous other modifications and variations can be devised without departing from the scope of the invention.

We claim:

1. A multiplier circuit for generating a plurality of partial products of a multiplier Y and a multiplicand X by Booth's algorithm and adding the plurality of partial products to obtain a multiplicand result XY of said multiplier Y and said multiplicand X, comprising:

decode means receiving said multiplier Y for decoding said multiplier Y to output a plurality of partial product information groups indicating kinds of the partial products with said multiplicand X, said plurality of partial product information groups having a plurality of partial product information provided in a one-to-one correspondence for each kind of partial product, respectively;

partial product generating means receiving said multiplicand X and said plurality of partial product information groups for generating the plurality of partial products of said multiplicand X and said multiplier Y on the basis of said plurality of partial product information groups; and partial product adding means receiving said plurality of partial products and adding said plurality of partial products to output said multiplication result XY;

wherein in each of said plurality of partial product information groups, a piece of information in said plurality of partial product information is partial product 0X information indicating whether the partial product is 0X of multiplying the multiplicand X by 0 or not, and said partial product adding means includes a plurality of adders each for performing an adding processing of its one input and another input, further receives a plurality of said partial product 0X information in said plurality of partial product information groups, recognizes partial products of "0" from said plurality of partial products on the basis of said plurality of partial product 0X information and, without effectively operating the 0 input adder of said plurality of adders receiving said recognized "0" partial product as one input in said plurality of adders, performs the adding processing in the other adders while outputting the other input of said 0 input adders directly as the outputs of said 0 input adders.

2. The multiplier circuit according to claim 1, wherein said plurality of adders include at least one half adder which receives one input and the another input and performs an adding processing to output an add output and a carrier output, said partial product adding means includes at least one half adding portion, said at least one half adding portion comprising, a half adder be one of said at least one half adder, a half adder input control portion which receives first and second partial product 0X information respectively corresponding to the one input and the other input of said half adder and compulsorily fixes the one input and the other input of said half adder to "0" when at least one of said first and second partial product 0X information indicates 0X, and a half adder output control portion which, on the basis of said first and second partial product 0X information, when one of said first and second partial product 0X information indicates 0X, compulsorily sets one of the one input and the other input of said half adder corresponding to the other partial product 0X information as said add output, and compulsorily sets "0" as said carrier output.

3. The multiplier circuit according to claim 1, wherein said plurality of adders include at least one full adder which receives one input, the another input and a carrier input and performs an adding processing to output an add output and a carrier output, said partial product adding means includes at least one full adding portion, said at least one full adding portion comprising, a full adder be one of said at least one half adder, a full adder input control portion which receives partial product 0X information corresponding to the other input of said full adder and compulsorily fixes the one input, the other input and the carrier input of said full adder to "0" when said partial product 0X information indicates 0X, and a full adder output control portion which compulsorily sets one input of said full adder as said add output and compulsorily sets said carrier input as said carrier output when said partial product 0X information indicates 0X.

4. The multiplier circuit according to claim 1, further comprising storage means for storing said plurality of partial product information groups, wherein said partial product generating means receives said partial product information groups from said storage means.

5. The multiplier circuit according to claim 4, wherein said storage means includes, a first register circuit receiving said plurality of partial product information groups in parallel, respectively, and parallel/serial converting to output serial partial product information, and a second register circuit receiving said serial partial product information, serial/parallel converting the serial partial product information, and outputting said plurality of partial product information groups to said partial product generating means.

\* \* \* \* \*